US012271194B2

(12) United States Patent
Bramley et al.

(10) Patent No.: US 12,271,194 B2
(45) Date of Patent: Apr. 8, 2025

(54) USING NEURAL NETWORKS TO PERFORM FAULT DETECTION IN AUTONOMOUS DRIVING APPLICATIONS

(71) Applicant: NVIDIA Corporation, Santa Clara, CA (US)

(72) Inventors: Richard Bramley, Santa Clara, CA (US); Philip Payman Shirvani, San Mateo, CA (US); Nirmal Saxena, Los Altos Hills, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/157,365

(22) Filed: Jan. 20, 2023

(65) Prior Publication Data
US 2023/0152805 A1    May 18, 2023

Related U.S. Application Data

(63) Continuation of application No. 16/745,238, filed on Jan. 16, 2020, now Pat. No. 11,592,828.

(51) Int. Cl.
*G05D 1/00* (2024.01)
*G06F 18/2431* (2023.01)
(Continued)

(52) U.S. Cl.
CPC ......... *G05D 1/0088* (2013.01); *G05D 1/0221* (2013.01); *G05D 1/0246* (2013.01);
(Continued)

(58) Field of Classification Search
CPC .. G05D 1/0088; G05D 1/0221; G05D 1/0246; G05D 2201/0213; G06F 18/2431;
(Continued)

(56) References Cited

U.S. PATENT DOCUMENTS 5,919,267 A * 7/1999 Urnes ................. G06F 11/0751
714/E11.026
10,261,685 B2 * 4/2019 Deselaers ............. G06F 3/0418
(Continued)

FOREIGN PATENT DOCUMENTS

CN          104616244 A      5/2015
CN          107330519 A     11/2017
(Continued)

OTHER PUBLICATIONS

IEC 61508, "Functional Safety of Electrical/Electronic/Programmable Electronic Safety-related Systems, " https://en.wikipedia.org/wiki/IEC_61508, accessed on Apr. 1, 2022, 7 pgs.
(Continued)

*Primary Examiner* — Charles T Shedrick
(74) *Attorney, Agent, or Firm* — Taylor English Duma L.L.P.

(57) ABSTRACT

In various examples, motifs, watermarks, and/or signature inputs are applied to a deep neural network (DNN) to detect faults in underlying hardware and/or software executing the DNN. Information corresponding to the motifs, watermarks, and/or signatures may be compared to the outputs of the DNN generated using the motifs, watermarks and/or signatures. When a the accuracy of the predictions are below a threshold, or do not correspond to the expected predictions of the DNN, the hardware and/or software may be determined to have a fault—such as a transient, an intermittent, or a permanent fault. Where a fault is determined, portions of the system that rely on the computations of the DNN may be shut down, or redundant systems may be used in place of the primary system. Where no fault is determined, the computations of the DNN may be relied upon by the system.

20 Claims, 14 Drawing Sheets

(51) Int. Cl.
*G06N 3/04* (2023.01)
*G06V 10/764* (2022.01)
*G06V 10/82* (2022.01)
*G06V 10/98* (2022.01)
*G06V 20/56* (2022.01)

(52) U.S. Cl.
CPC .......... *G06F 18/2431* (2023.01); *G06N 3/04* (2013.01); *G06V 10/764* (2022.01); *G06V 10/82* (2022.01); *G06V 10/98* (2022.01); *G06V 20/56* (2022.01)

(58) Field of Classification Search
CPC . G06F 21/16; G06N 3/04; G06N 3/08; G06N 20/00; G06N 3/045; G06V 10/764; G06V 10/82; G06V 10/98; G06V 20/56; G01C 21/28
See application file for complete search history.

(56) References Cited

U.S. PATENT DOCUMENTS

| | | | |
|---|---|---|---|
| 10,474,543 B1* | 11/2019 | Kim | G06V 10/255 |
| 10,679,046 B1* | 6/2020 | Black | G06V 40/23 |
| 10,715,570 B1 | 7/2020 | Feinstein | |
| 10,885,698 B2 | 1/2021 | Muthler et al. | |
| 11,232,016 B1 | 1/2022 | Huynh et al. | |
| 11,423,263 B2 | 8/2022 | Kobayashi | |
| 11,592,828 B2 | 2/2023 | Bramley et al. | |
| 2005/0267726 A1 | 12/2005 | Kim et al. | |
| 2008/0019661 A1* | 1/2008 | Obrador | H04N 5/147 386/210 |
| 2010/0138368 A1* | 6/2010 | Stundner | G06N 20/00 706/47 |
| 2016/0214595 A1* | 7/2016 | Baehrle-Miller | B60T 17/221 |
| 2018/0253424 A1* | 9/2018 | Banerjee | G06F 16/583 |
| 2018/0285694 A1 | 10/2018 | Kobayashi | |
| 2019/0235515 A1 | 8/2019 | Shirvani et al. | |
| 2019/0258878 A1 | 8/2019 | Koivisto et al. | |
| 2019/0266418 A1* | 8/2019 | Xu | G06V 10/457 |
| 2019/0354420 A1 | 11/2019 | Venkatesan et al. | |
| 2019/0370440 A1 | 12/2019 | Gu et al. | |
| 2020/0012457 A1 | 1/2020 | Ota | |
| 2020/0097797 A1* | 3/2020 | Aragon | H04L 67/12 |
| 2020/0192392 A1 | 6/2020 | Kim et al. | |
| 2020/0213875 A1 | 7/2020 | Seol et al. | |
| 2020/0310400 A1* | 10/2020 | Jha | G05B 23/0254 |
| 2020/0311483 A1 | 10/2020 | Goto et al. | |
| 2020/0311943 A1 | 10/2020 | Dai et al. | |
| 2020/0326717 A1* | 10/2020 | Chen | G06V 20/56 |
| 2020/0410297 A1 | 12/2020 | Willers et al. | |
| 2020/0410655 A1 | 12/2020 | Imamura et al. | |
| 2021/0049455 A1* | 2/2021 | Kursun | G06N 3/047 |
| 2021/0097661 A1* | 4/2021 | Palo | G06T 5/70 |
| 2021/0107539 A1 | 4/2021 | Howard et al. | |
| 2021/0150696 A1* | 5/2021 | Bidault | G06N 3/04 |
| 2021/0223780 A1 | 7/2021 | Bramley et al. | |
| 2021/0240803 A1* | 8/2021 | Michiels | G06F 21/16 |
| 2021/0323555 A1 | 10/2021 | Sholingar et al. | |
| 2021/0382893 A1 | 12/2021 | Kumar et al. | |
| 2021/0383616 A1* | 12/2021 | Rong | G06N 3/08 |
| 2022/0004818 A1* | 1/2022 | Koopman | G06V 10/98 |
| 2022/0048525 A1 | 2/2022 | Tsai et al. | |
| 2022/0067531 A1 | 3/2022 | Chen et al. | |
| 2022/0076385 A1 | 3/2022 | K S et al. | |
| 2022/0114478 A1 | 4/2022 | Sung et al. | |
| 2022/0130136 A1 | 4/2022 | Ando | |
| 2022/0222527 A1 | 7/2022 | Khalil et al. | |
| 2023/0148384 A1* | 5/2023 | Liu | G06N 20/00 382/107 |
| 2023/0152805 A1* | 5/2023 | Bramley | G06F 18/2431 706/15 |
| 2023/0297904 A1* | 9/2023 | Cella | G06N 3/126 705/7.12 |

FOREIGN PATENT DOCUMENTS

| | | | | |
|---|---|---|---|---|
| CN | 107832219 A | 3/2018 | | |
| CN | 109582484 A | 4/2019 | | |
| CN | 109948788 A | 6/2019 | | |
| CN | 110168576 A | 8/2019 | | |
| CN | 113139642 A1 | 7/2021 | | |
| DE | 19902923 A1 | 8/2000 | | |
| DE | 102021105249 A1 * | 9/2021 | | G06N 20/00 |
| WO | 2019190886 A1 | 10/2019 | | |
| WO | 2020093724 A1 | 5/2020 | | |

OTHER PUBLICATIONS

ISO 26262, "Road vehicle—Functional safety," International standard for functional safety of electronic system, https://en.wikipedia.org/wiki/ISO_26262, accessed on Sep. 13, 2021, 8 pgs.
Bramley, Richard; Notice of Allowance for U.S. Appl. No. 16/745,238, filed Jan. 16, 2020, mailed Oct. 24, 2022, 18 pgs.
Liu, et al.; "Powering Hidden Markov Model by Neural Network based Generative Models"; https://arxiv.org/abs/1910.05744#, May 24, 2020, 15 pgs.
"Taxonomy and Definitions for Terms Related to Driving Automation Systems for On-Road Motor Vehicles", Society of Automotive Engineers (SAE), Standard No. J3016-201609, pp. 30 (Sep. 30, 2016).
"Taxonomy and Definitions for Terms Related to Driving Automation Systems for On-Road Motor Vehicles", Society of Automotive Engineers (SAE), Standard No. J3016-201806, pp. 35 (Jun. 15, 2018).
Sung, et al.; "Resiliency of deep neural networks under quantization," arXiv preprint arXiv:1511.06488 (2015).
Bramley, Richard; First Office Action for Chinese Patent Application No. 202110041653.4, Filed Jan. 13, 2021, mailed Sep. 29, 2023, 8 pgs.
Bramley, Richard; Notification of Registration and Granting Patent Rights for Chinese Patent Application No. 202110041653.4, filed Jan. 13, 2021, mailed Jan. 31, 2024, 5 pgs.

* cited by examiner

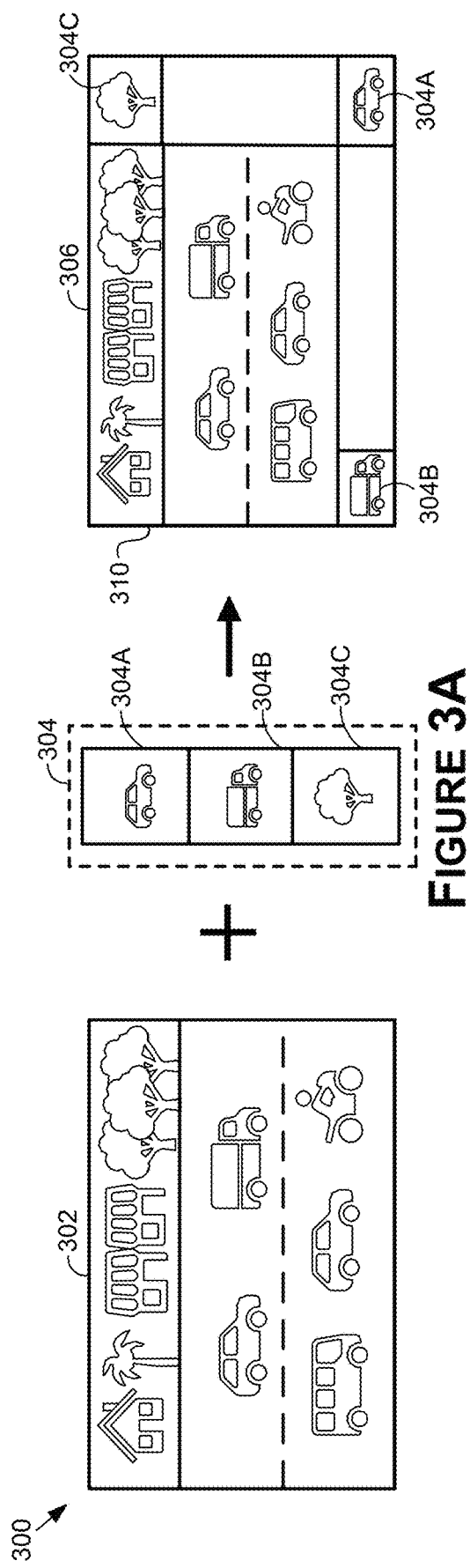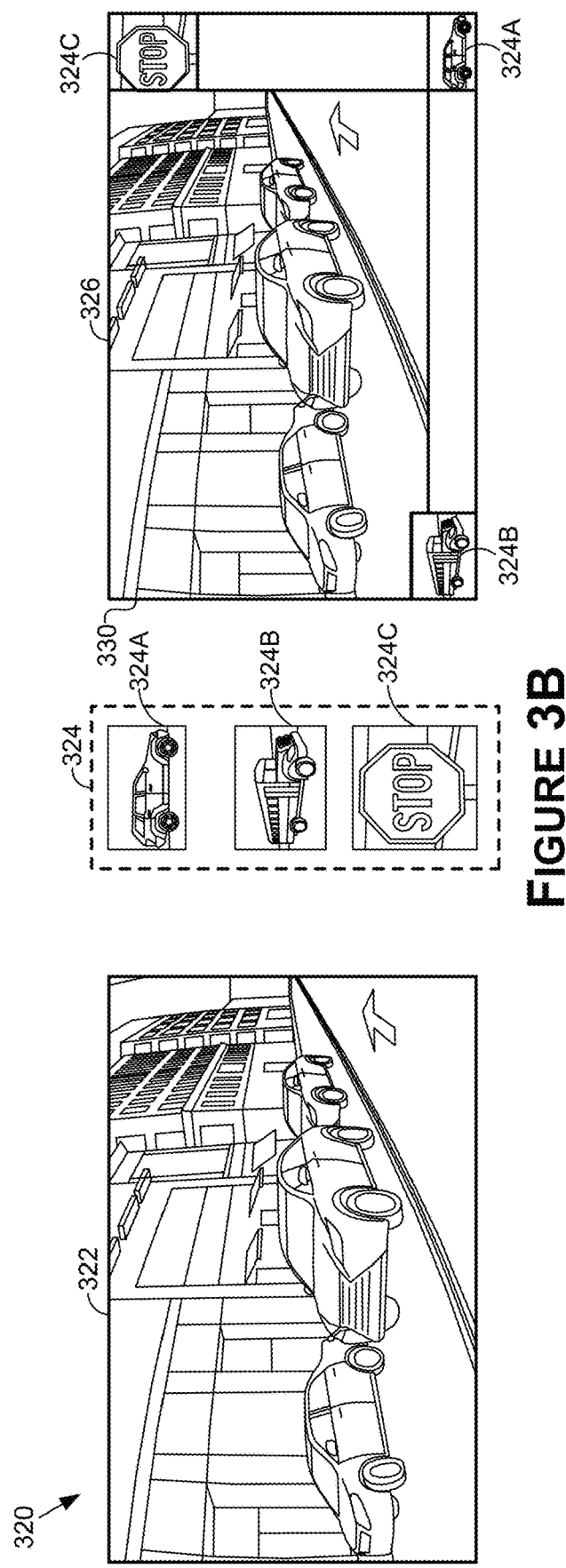

USING NEURAL NETWORKS TO PERFORM FAULT DETECTION IN AUTONOMOUS DRIVING APPLICATIONS

CROSS-REFERENCE TO RELATED APPLICATIONS

This application is a continuation of U.S. patent application Ser. No. 16/745,238, filed Jan. 16, 2020, which is incorporated herein by reference in its entirety.

BACKGROUND

Autonomous driving systems and advanced driver assistance systems (ADAS) may leverage sensors (such as cameras) to perform various tasks—such as without limitation, lane keeping, lane changing, lane assignment, lane detection, object detection, path planning, camera calibration, and localization. To perform many of these tasks, machine learning models—and specifically deep neural networks (DNNs)—may be used to perform at least some of the processing. As a result, for these systems to operate with a level of safety required for autonomous or semi-autonomous driving functionality, the machine learning models need to execute as intended over the life of their implementation.

However, software and/or hardware used to execute these DNNs may be compromised by a variety of sources—resulting in transient faults and/or permanent faults—that may lead to inaccurate predictions that may potentially compromise the effectiveness of the DNNs. As examples, potential causes of faults in DNNs may include hardware faults in processing units executing the DNNs, and/or software faults of the underlying DNN. As such, the ability to robustly and accurately detect faults associated with the DNNs may allow the autonomous and/or ADAS systems to make critical decisions in real-time or near real time—such as to suggest or implement corrective measures for effective and safe driving. For example, accurately, efficiently, and timely identifying DNN faults may allow a system to identify when operations of the system that rely on predictions of the DNN are impaired and, as a result, allow the system to perform corrective operations, such as handing control back to a human driver or executing a safety maneuver (e.g., pulling to the side of the road).

In conventional systems, resilience and/or fault coverage of a DNN may be determined by redundant execution of the DNN. For example, two or more instances of a DNN may be executed on the same input data, and the outputs of the two or more instances may be compared to one another to determine if any discrepancies exist. However, running multiple instances of a DNN is both memory and processing intensive, also requiring—in some scenarios—additional hardware utilization for running the concurrent instances. In addition, these conventional systems require that the outputs of the two or more instances of the DNN be compared, often at each iteration, further adding to the computational expense. Due to the computational burden of these conventional approaches on the underlying system, executing these processes may prevent real-time or near real-time fault detection capabilities.

SUMMARY

Embodiments of the present disclosure relate to fault detection in neural networks. Systems and methods are disclosed that use techniques to detect transient and/or permanent faults in one or more components of a hardware and/or software system using a single instance of a neural network.

In contrast to conventional systems, such as those described above, the system of the present disclosure may implement a deep neural network (DNN) to detect faults in at least the hardware and/or software executing the DNN by using motifs, watermarks, and/or signatures (e.g., signature images) as inputs—or modifications to inputs—of the DNN. As a result of the processes described herein, fault analysis with increased fault coverage as compared to conventional approaches may be performed using a single instance of a DNN—thereby reducing the computational expense and enabling deployment in real-time or near real-time. For example, due to the real-time capability of the present system, fault detection in DNNs may be executed as part of a built-in self-test (BIST) system operating in deployment.

Motifs, watermarks, and/or signatures may be used as input, or appended to inputs (e.g., appended to sensor data), for the DNN. In non-limiting embodiments, the motifs, watermarks, and/or signatures may be selected to leverage the downstream task that the DNN is already trained for. For example, where the DNN is trained for object detection, or specifically detection of vehicles, pedestrians, and bicyclists, the motifs, watermarks, and/or signatures may represent vehicles, pedestrians, and/or bicyclists. Predictions of the DNN with respect to the motifs, watermarks, and/or signatures may be compared to expected predictions with respect to the same, and inconsistencies may be analyzed to determine whether a fault exists. By appending and/or using the motifs, watermarks, and/or signatures as input, the motifs, watermarks, and/or signatures may be processed by the single instance of a DNN—thereby reducing compute resources as compared to conventional systems that require multiple instances of a DNN for fault detection while simultaneously decreasing run-time to allow for real-time deployment.

BRIEF DESCRIPTION OF THE DRAWINGS

The present systems and methods for fault detection in neural networks are described in detail below with reference to the attached drawing figures, wherein:

FIGS. 3A-3B include example illustrations of appending motifs to an input image, in accordance with some embodiments of the present disclosure;

DETAILED DESCRIPTION

Figure 1:
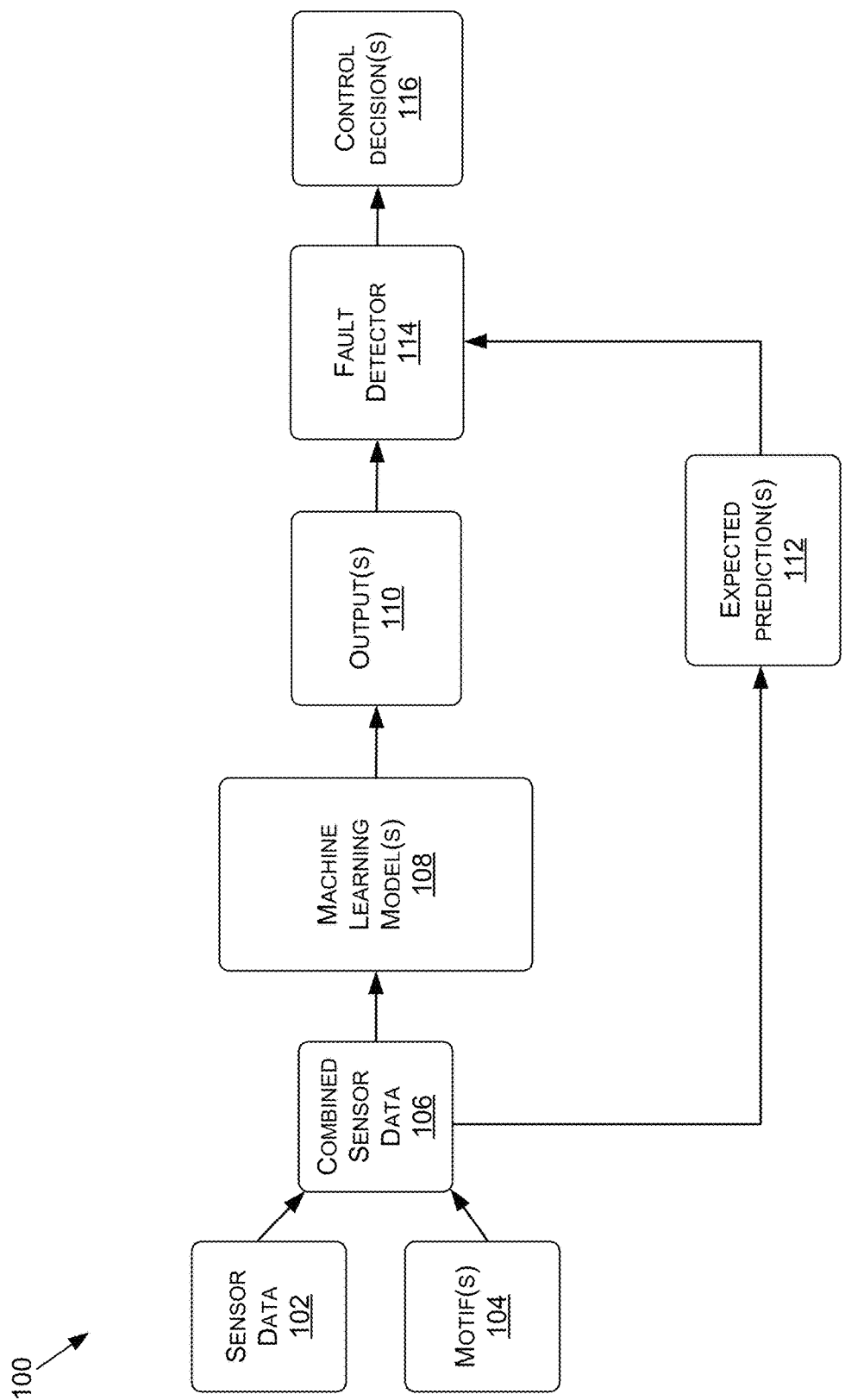
FIG. 1 is an example data flow diagram illustrating a process for detecting transient faults in neural networks, in accordance with some embodiments of the present disclosure.

Systems and methods are disclosed related to fault detection in neural networks. The systems and methods described herein may be used in augmented reality, virtual reality, robotics, security and surveillance, medical imaging, autonomous or semi-autonomous machine applications, gaming, financial services, marketing and sales, government applications, oil and gas technology, weather forecasting, and/or any other technology spaces where neural networks or other machine learning models are used—and thus may benefit from fault detection with respect to the same. Although the present disclosure may be described with respect to an example autonomous vehicle 1000 (alternatively referred to herein as "vehicle 1000" or "autonomous vehicle 1000," an example of which is described with respect to FIGS. 10A-10D), this is not intended to be limiting. For example, the systems and methods described herein may be used by, without limitation, non-autonomous vehicles, semi-autonomous vehicles (e.g., in one or more adaptive driver assistance systems (ADAS)), robots, warehouse vehicles, off-road vehicles, flying vessels, boats, shuttles, emergency response vehicles, motorcycles, electric or motorized bicycles, aircraft, construction vehicles, underwater craft, drones, and/or other vehicle types. In addition, although the faults of the present disclosure may refer primarily to any transient or permanent faults related to hardware and/or software of the underlying system, this is not intended to be limiting. For example, where transient fault detection is described herein, such examples may also be used for permanent fault detection, and vice versa. Similarly, in addition to or alternatively from transient and permanent faults, the systems and methods of the present disclosure may be leveraged for intermittent fault detection and/or other types of fault detection, without departing from the scope of the present disclosure.

Transient Fault Detection Method

As described herein, in contrast to conventional approaches of neural network fault detection, the current system detects transient and/or permanent faults in DNNs using motifs, watermarks, and/or signatures (e.g., signature images) as input—or as modifications to inputs—of the DNN. As a result, fault analysis of the DNN may be performed using a single instance of a DNN—thereby reducing the computational expense as compared to conventional systems and enabling deployment in real-time or near real-time. In some non-limiting embodiments, such as for transient fault detection, motifs or watermarks may be appended to input data (e.g., image data representative of images) to enable fault detection using the DNNs. For example, motifs or watermarks corresponding to the types of predictions the DNN is trained to make may be appended to the input data, thereby leveraging the already trained DNN to make fault predictions. In such embodiments, the predictions of the DNN with respect to the motifs or watermarks may be compared to expected predictions of the DNN with respect to the motifs or watermarks, and inconsistencies may be analyzed to determine whether a fault is present.

With reference to detecting a fault(s) using a DNN, sensor data (e.g., images, videos, depth maps, point clouds, etc.) may be received from sensors (e.g., cameras, LIDAR, RADAR, etc.) disposed on or otherwise associated with a vehicle (e.g., an autonomous vehicle, a semi-autonomous vehicle, etc.). Motifs may be introduced (e.g., appended) to the sensor data to generate input data representing the sensor data and the motifs. The input data may be applied to a DNN that is trained to generate predictions (e.g., locations and/or classes of objects, locations of lines, lanes, signs, etc., intersections, paths, etc.) based on the input data. As such, the motifs or watermarks may correspond to the types and/or classes of objects, lines, etc. that the DNN is trained to predict.

The DNN may then output predictions corresponding to the sensor data and the motifs included in the input data. A fault detector may then be used to compare the predictions of the DNN to expected predictions corresponding to the motifs. For example, the expected predictions may include actual locations and/or class labels of the motifs, which may have been stored at the time the motifs are introduced into the input data. The comparison may include comparing locations and/or class labels corresponding to the input data to ensure that the predictions at least include accurate or expected predictions with respect to the motifs. Based on the comparison, the accuracy or resiliency of the network may be determined, such as by identifying if the predictions of the DNN do not correspond to the motif information known to the fault detector, or the predictions are outside of a threshold accuracy with respect to the motif information.

For example, when the expected predictions corresponding to the motifs are represented in the predictions of the DNN, the DNN predictions may be determined to be accurate, and the DNN, or the supporting hardware and/or software, may be considered fault free at least with respect to the processing of the DNN. Similarly, when the expected predictions corresponding to the motifs are not represented in the predictions of the DNN, the DNN predictions may be determined to be inaccurate, the predictions may be thrown out or disregarded by the system, and/or the DNN, or the supporting hardware and/or software may be considered to include a fault—such as a transient fault. In such examples, where a fault is detected, corrective measures may be taken, such as to hand over the control of the vehicle to the driver, perform a safety maneuver, and/or to offload or transfer processing of the DNN to other components—e.g., a redundant architecture. In some examples, the motifs may be applied at each iteration of sensor data input to the DNN. In this way, the system may account for faults on an ongoing basis, thereby increasing safety of the system. However, this is not intended to be limiting, and the motifs may be appended at a different interval, such as randomly, every other instance of the input data, every third instance of the input data, every tenth instance of the input data, and so on.

In some examples, the motifs may be selected from patterns encountered by the DNN during training. For example, the DNN may be trained for object detection, including outputting predictions corresponding to predicted locations of objects detected in sensor data. In such an example, the motifs may be selected to match objects encountered by the neural network during training in the training dataset. In this way, the DNN's training may be leveraged to determine whether the network has transient faults, and the DNN may not need to be retrained to detect the motifs. Further, the location, number, class, and/or type of motifs may be changed at different iterations of the input data, thereby creating a robust fault detection system with increased fault coverage.

Now with reference to FIG. 1, FIG. 1 is an example data flow diagram illustrating an example process 100 for fault detection in neural networks using motifs and/or watermarks, in accordance with some embodiments of the present disclosure. While the detection types primarily described herein with respect to FIG. 1 are transient or permanent fault detections, this is not intended to be limiting, and is for example purposes only. For example, the process 100 may be used to detect and classify any number of attributes and/or causes of the faults, such as those described herein, without departing from the scope of the present disclosure.

The process 100 may include generating and/or receiving sensor data 102 from one or more sensors. The sensor data 102 may be received, as a non-limiting example, from one or more sensors of a vehicle (e.g., vehicle 1000 of FIGS. 10A-10C and described herein). The sensor data 102 may be used by the vehicle, and within the process 100, to detect and classify neural network faults in real-time or near real-time. The sensor data 102 may include, without limitation, sensor data 102 from any of the sensors of the vehicle including, for example and with reference to FIGS. 10A-10C, global navigation satellite systems (GNSS) sensor(s) 1058 (e.g., Global Positioning System sensor(s)), RADAR sensor(s) 1060, ultrasonic sensor(s) 1062, LIDAR sensor(s) 1064, inertial measurement unit (IMU) sensor(s) 1066 (e.g., accelerometer(s), gyroscope(s), magnetic compass(es), magnetometer(s), etc.), microphone(s) 1076, stereo camera(s) 1068, wide-view camera(s) 1070 (e.g., fisheye cameras), infrared camera(s) 1072, surround camera(s) 1074 (e.g., 360 degree cameras), long-range and/or mid-range camera(s) 1078, speed sensor(s) 1044 (e.g., for measuring the speed of the vehicle 1000), and/or other sensor types. As another example, the sensor data 102 may include virtual sensor data generated from any number of sensors of a virtual vehicle or other virtual object. In such an example, the virtual sensors may correspond to a virtual vehicle or other virtual object in a simulated environment (e.g., used for testing, training, and/or validating neural network performance), and the virtual sensor data may represent sensor data captured by the virtual sensors within the simulated or virtual environment. As such, by using the virtual sensor data, the machine learning model(s) 108 described herein may be tested, trained, and/or validated using simulated data in a simulated environment, which may allow for testing more extreme scenarios outside of a real-world environment where such tests may be less safe.

In some embodiments, the sensor data 102 may include image data representing an image(s), image data representing a video (e.g., snapshots of video), and/or sensor data representing representations of sensory fields of sensors (e.g., depth maps for LIDAR sensors, a value graph for ultrasonic sensors, etc.). Where the sensor data 102 includes image data, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the sensor data 102 may be used within the process 100 without any pre-processing (e.g., in a raw or captured format), while in other examples, the sensor data 102 may undergo pre-processing (e.g., noise balancing, demosaicing, scaling, cropping, augmentation, white balancing, tone curve adjustment, etc., such as using a sensor data pre-processor (not shown)). As used herein, the sensor data 102 may reference unprocessed sensor data, pre-processed sensor data, or a combination thereof.

Motif(s) 104 may include, without limitation, motifs and/or watermarks to be included with (e.g., appended) the sensor data 102 to generate combined sensor data 106. In some embodiments, the motif(s) 104 may be represented by image data corresponding to the types of predictions the machine learning model(s) 108 is trained to make. For example, for a machine learning model(s) 108 trained to detect and/or classify object(s) such as cars, trucks, road signs, pedestrians, etc., the motif(s) 104 may be chosen to be an image of a car, truck, road sign, and/or pedestrian. In another example, for a machine learning model(s) 108 trained to detect and/or classify lanes, the motif(s) 104 may be chosen as an additional line(s) or lane marking(s) of a lane. As such, in some examples, the motif(s) 104 may be representative of patterns already encountered by the machine learning model(s) 108 during training and/or inference. In such an example, the motif(s) 104 may be selected to match objects encountered by the machine learning model(s) 108 during training in a training dataset. In this way, the training of the machine learning model(s) 108 may be leveraged to determine whether the network has transient faults, and the machine learning model(s) 108 may not need to be retrained, or separately trained, to detect the motif(s) 104.

In other examples, the machine learning model(s) 108 may be trained using training sensor data that is similar to the combined sensor data 106. For example, during training, the training sensor data may be appended or augmented with motif(s) 104 such that the machine learning model(s) 108 are trained to predict the motif(s) 104 directly. In such examples, the machine learning model(s) 108 may be trained for a first task(s) with respect to the training sensor data and a second task(s) with respect to the motif(s) 104. As a non-limiting example, the machine learning model(s) 108 may be trained on depth maps corresponding to LIDAR data, and the depth maps may be appended with a motif(s) 104 of objects to be detected. As such, the machine learning model(s) 108 may be trained to make predictions using the depth maps while also being trained to make different predictions corresponding to the motif(s) 104. In other embodiments, the use of the motif(s) 104 in training may be for the same task as the primary task of the machine learning model(s) 108 (e.g., object detection).

The combined sensor data 106 may include data representative of a combination of the sensor data 102 and the motif(s) 104. The combined sensor data 106 may be used as an input to the machine learning model(s) 108. In some examples, a similar type, number, and/or class of motif(s) 104, or the exact type, number, and/or class of motif(s) 104, may be included in the combined sensor data 106 at each iteration. In other examples, different types, number, or classes of motif(s) 104 may be introduced to the sensor data 102 at each iteration. In addition, a location and/or size of the motif(s) 104 may remain constant across iterations or may change at different iterations. In some embodiments, to increase fault coverage, the locations, types, number, classes, and/or sizes of the motif(s) 104 may be changed at different iterations of the combined sensor data 106. For example, because different portions of the underlying hardware and/or software processing the machine learning model(s) 108 may process information corresponding to different portions of the combined sensor data 106, by moving, resizing, or otherwise changing the motif(s) 104 in different iterations, a greater extent of the underlying hardware and/or software may be fault tested.

In non-limiting embodiments, the machine learning model(s) 108 may be trained using training data (e.g., training images or other training data representations) corresponding to a full image or other representation (e.g., without motif(s) 104) at a first spatial resolution. In such embodiments, during inference, the sensor data 102—or the image or other representation thereof—may be downscaled from the first spatial resolution to a second spatial resolution, and the motif(s) 104 may be appended to the sensor data 102 to generate the combined sensor data 106 at the first spatial resolution. As such, the training sensor data may be at a same spatial resolution as the combined sensor data 106 that includes the motif(s) 104, thereby allowing the machine learning model(s) 108 to be trained for a downstream task (e.g., object detection, line regression, etc.) using training sensor data that is different (e.g., doesn't have motif(s) 104) from the combined sensor data 106 used during inference. In such embodiments, the motif(s) 104 may represent, as described herein, representations that the machine learning model(s) 108 is trained to detect or regress on—such as certain types of objects or other features of environments. As such, a machine learning model(s) 108 trained to perform a particular task without fault detection in mind, may then have the fault detection methods described herein (e.g., appending or otherwise adding motif(s) 104 to sensor data 102) implemented at inference without impacting the performance of the machine learning model(s) 108 or requiring retraining. As non-limiting examples, FIGS. 3A-3B illustrate—among other things—how an original image may be downsized and have a motif(s) 104 appended thereto to generate combined sensor data 106.

The location, class, number, size, and/or type of motif(s) 104 from the combined sensor data 106 may be tracked and/or stored as expected prediction(s) 112. Where the motif(s) 104 is fixed at each iteration, the expected prediction(s) 112 may also be fixed, and only stored a single time. Where the motif(s) 104 is dynamic, the location, class, number, size, and/or type of motif(s) 104 may be tracked over time and stored for use by a fault detector 114 in determining whether or not a fault is present. For example, the fault detector 114 may compare data from an output(s) 110 to the expected prediction(s) 112 to see whether the output(s) 110 aligns with the expected prediction(s) 112 (e.g., if a motif is a vehicle of class A in an upper right of an image, the fault detector 114 may look for data in the output(s) 110 indicating a vehicle is present, of class A, in the upper right of an image—as denoted by a location of a bounding box, for example). In some examples, the expected prediction(s) 112 may be stored as a data structure storing pixel locations where each motif(s) 104 is located and/or a corresponding type and/or class of the motif(s) 104.

The machine learning model(s) 108 may use as input one or more images or other data representations (e.g., depth maps or point clouds from LIDAR data, images from RADAR data, etc.) as represented by the combined sensor data 106 to generate output(s) 110. In a non-limiting example, the machine learning model(s) 108 may take, as input, an image(s) represented by the combined sensor data 106 (e.g., after appending the sensor data 102 with motif(s) 104) to generate the output(s) 110. Although examples are described herein with respect to using neural networks, and specifically DNNs, as the machine learning model(s) 108, this is not intended to be limiting. For example, and without limitation, the machine learning model(s) 108 described herein may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models. Further, the machine learning model(s) 108 may be any machine learning model trained to detect any types and/or classes of objects, lines, etc. that the DNN is trained to predict. As such, the machine learning model(s) 108 may be an object detection model, segmentation model, lane detection model, etc.

The output(s) 110 of the machine learning model(s) 108 may include predictions corresponding to the combined sensor data 106. For example, the output(s) of the machine learning model(s) may include types, classes, sizes, locations, values, and/or other information corresponding to the combined sensor data 106. For example, for a machine learning model(s) 108 trained to detect objects, the output(s) 110 may include pixel locations for vertices of bounding shapes corresponding to the objects and/or class labels associated therewith. In some embodiments, the outputs of the machine learning model(s) 108 for one or more of the predictions may include confidence values. For example, each pixel in a predicted pattern region, or for each predicted pattern (or vertices thereof), confidence values may be output for each class type the machine learning model(s) 108 is trained to predict, with the highest confidence being determined to be the class of the object. As such, once the highest confidence class is determined, this class may be compared to the expected prediction(s) 112 to determine whether or not there is an issue—and ultimately whether or not there is a fault.

To determine the faults, as described herein, the output(s) 110 of the machine learning model(s) 108 and the expected prediction(s) 112 may be analyzed or compared by the fault detector 114 to determine the accuracy of the output(s) 110 with respect to the expected prediction(s) 112 determined from the combined sensor data 106. As another non-limiting example with respect to object detection, for each motif of the motif(s) 104 introduced to the sensor data 102, the expected prediction(s) 112 including the actual location and/or actual class label with respect to the combined sensor data 106 may be compared with the predicted locations and/or the predicted class labels in the output(s) 110 to check the accuracy of the predictions or results.

Based on the comparison, the accuracy or resiliency of the machine learning model(s) 108 may be determined, such as by identifying if the predictions or output(s) 110 of the machine learning model(s) 108 do not correspond to the motif information known to the fault detector 114, or the predictions are outside of a threshold accuracy with respect to the motif information. In some examples, when the expected predictions(s) 112 for each motif(s) 104 are represented in the output(s) 110, the fault detector 114 may determine that the predictions of the machine learning model(s) 108 are accurate and the underlying hardware and/or software of the machine learning model(s) 108 does not have a fault. Similarly, when the expected predictions(s) 112 for each motif(s) 104 are not represented in the output(s) 110, the fault detector 114 may determine that the predictions of the machine learning model(s) 108 are inaccurate and the underlying hardware and/or software of the machine learning model(s) 108 has a fault(s). In an example, output(s) 110 must include representation of each of the motif(s) 104 in the combined sensor data 106 for the machine learning model(s) 108 to be determined fault-free. The machine learning model(s) 108 may be determined to have a transient fault when the results of the machine learning model(s) 108 are found to be inaccurate. This may allow the system to perform fault detection using a single instance of the machine learning model(s) 108 while—in some embodiments—leveraging the training of the machine learning model(s) 108 to detect faults in real-time or near real-time.

Once a fault or no-fault determination is made, this information may be passed to one or more components of the system to make control decision(s) 116. For example, where the system is the vehicle 1000, described herein, the fault determination may be passed to one or more layers of an autonomous driving software stack (e.g., a planning layer, a control layer, a world-model manager, a perception layer, an obstacle avoidance layer of the drive stack, an actuation layer of the drive stack, etc.) to determine an appropriate control decision(s) 116. For example, where predictions are outside of a threshold accuracy with respect to the motif information, some or all of the outputs of the machine learning model(s) 108 may be skipped over or disregarded with respect to one or more of the control decision(s) 116. In some examples, such as where the predictions of the machine learning model(s) 108 are inaccurate and unusable for safe operation of the vehicle 1000, the control decision(s) 116 may include handing control back to a driver (e.g., exiting autonomous or semi-autonomous operation), or executing an emergency or safety maneuver (e.g., coming to a stop, pulling to the side of the road, or a combination thereof). As such, the control decision(s) 116 may include suggesting one or more corrective measures for effective and safe driving—such as ignoring certain results of the machine learning model(s) 108. In any example, and with respect to autonomous or semi-autonomous driving, the control decision(s) 116 may include any decisions corresponding to a neural network manager layer of an autonomous driving software stack (alternatively referred to herein as a "drive stack"), a perception layer of the drive stack, a world model management layer of the drive stack, a planning layer of the drive stack, a control layer of the drive stack, an obstacle avoidance layer of the drive stack, and/or an actuation layer of the drive stack. In examples where there are no faults detected, the control decision(s) 116 may still be impacted by this information. For example, certain functions or features of the autonomous driving software stack may not be relied upon or used without an indication or signal being received (e.g., at each iteration, at an interval, etc.) indicating that the machine learning model(s) 108 is working properly. In some examples, the process 100 may be executed on any number of machine learning model(s) 108 operating within a system. For example, an autonomous driving software stack may rely on hundreds or thousands of machine learning model(s) 108 for effective and safe operation, and any number of these may be subject to the process 100 in order to ensure faults do not interfere with the safe and effective operation. As such, as described herein, the accuracy of the output(s) 110 may be separately determined for any number of different operations corresponding to one or more layers of the drive stack, using one or more machine learning model(s) 108. As an example, a first accuracy may be determined for object detection operations with respect to the perception layer of the drive stack using a first machine learning model, and a second accuracy may be determined for path planning with respect to the planning layer of the drive stack using a second machine learning model trained for regressing on lane lines.

Figure 2:
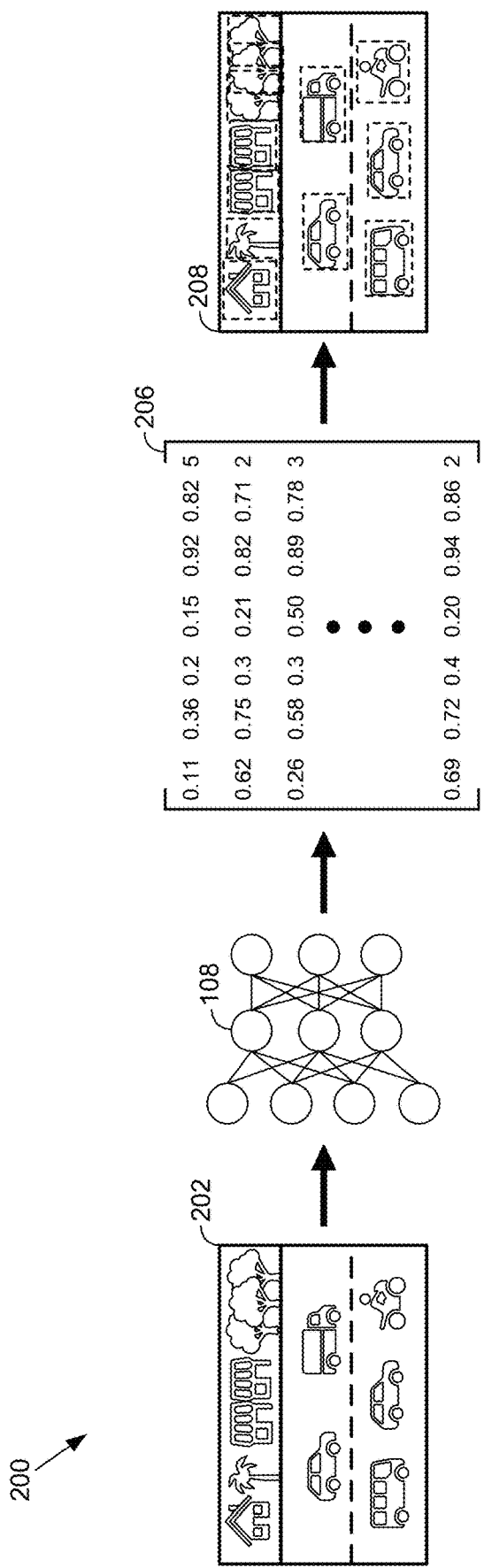
FIG. 2 includes an example illustration of a neural network trained to detect objects, in accordance with some embodiments of the present disclosure.

Now referring to FIG. 2, FIG. 2 is an illustration of an example machine learning model(s) 108 trained to detect objects, in accordance with some embodiments of the present disclosure. As described herein, machine learning model(s) 108 for object detection is only for example purposes, and other types of machine learning model(s) 108 may be used without departing from the scope of the present disclosure. In addition, although vehicles, trees, and buildings are primarily illustrated as examples of objects for detection, this is not intended to be limiting. As additional non-limiting examples, the machine learning model(s) 108 may be trained to perform inferencing for forecast predictions using images of clouds or cloud structures, for depth predictions using images (even though trained using a combination of LIDAR data, RADAR data, and/or image data, for example), for predicting conditions of offshore oil or gas pipelines using sensor data, etc.

With respect to FIG. 2, for example, the machine learning model(s) 108 may be trained to take as input the sensor data 102 representative of an image 202, and may output predictions 208 corresponding to objects in the image 202. The predictions 208 may be generated based on the object location(s) and/or associated object classifications (e.g., class labels) computed by the machine learning model(s) 108. For example, based on the shape, size, and/or location of the objects detected, each object may be classified as a car, bus, stop sign, pedestrian, truck, tree, building, etc.—e.g., based on the number of classes the machine learning model(s) 108 has been trained to detect. The machine learning model(s) 108 may output pixel by pixel output data 206 with each pixel associated with a value based on the predicted object classification (or empty class), or may output regressed pixel locations corresponding to the object(s) or bounding shapes corresponding thereto.

With reference to FIGS. 3A-3B, FIGS. 3A-3B are example illustrations of appending motifs to an input image, in accordance with some embodiments of the present disclosure. For example, the machine learning model(s) 108 may use image data representative of a combined image 310—that includes data representative of an input image 302 and one or more motifs 304—as input to generate predictions for the combined image 310. Referring to FIG. 3A, input image 302 may be introduced with motifs 304 (e.g., motifs 304A, 304B, 304C) to generate a combined image 310 with the motifs 304 appended on the input image 302. As described herein, in some examples the input image may be downsampled (e.g., by 10%, 20%, 35%, etc.) to generate a downsampled image 306 and the motifs 304 may be introduced to the downsampled image 306. In some embodiments, the motifs 304 may be located within the downsampled image 306 such that they are located outside the boundary of the downsampled image 306 while maintaining a spatial resolution for the combined image 310 that is the same or less than a spatial resolution of the original input image 302. For example, the motif 304A, the motif 304B, and the motif 304C may be added along a boundary (e.g., a top boundary, a bottom boundary, a side boundary, or a combination thereof) outside of the downsampled image 306, where the motifs 304 are sized such that the spatial resolution of the combined image 310 is similar to or the same as the original input image 302 (e.g., a spatial resolution that the machine learning model(s) 108 was trained on, and is programmed for).

Referring now to FIG. 3B, FIG. 3B illustrates an example illustration of appending motifs to an image captured by an image sensor of a vehicle. For example, the machine learning model(s) 108 may use image data representative of a combined image 330—that includes data representative of an input image 322 captured by the image sensor of the vehicle 1000 and one or more motifs 324—to generate predictions for the combined image 330. Similar to the description above with respect to the combined image 310, the input image 322 may be introduced with the motifs 324 (e.g., the motifs 324A, 324B, 324C) to generate the combined image 330.

Although FIGS. 3A-3B include appending the motifs 304 and 324 to a boundary of the original input images 302 and 322, respectively, this is not intended to be limiting. For example, the motifs may be added within the original images, may be added outside of boundaries of the original images, or a combination thereof. In addition, although the original input images 302 and 322 are described as being downsampled prior to appending the motifs 304 and 324, respectively, this is not intended to be limiting. For example, during training and inference the size of the original images may remain the same, and the motifs may either be added within the original images or the images used during training may also include portions designated for motifs (e.g., the machine learning model(s) 108 may be trained on training data that also includes the motifs, or that at least includes additional portions where motifs may be inserted).

Figure 4:
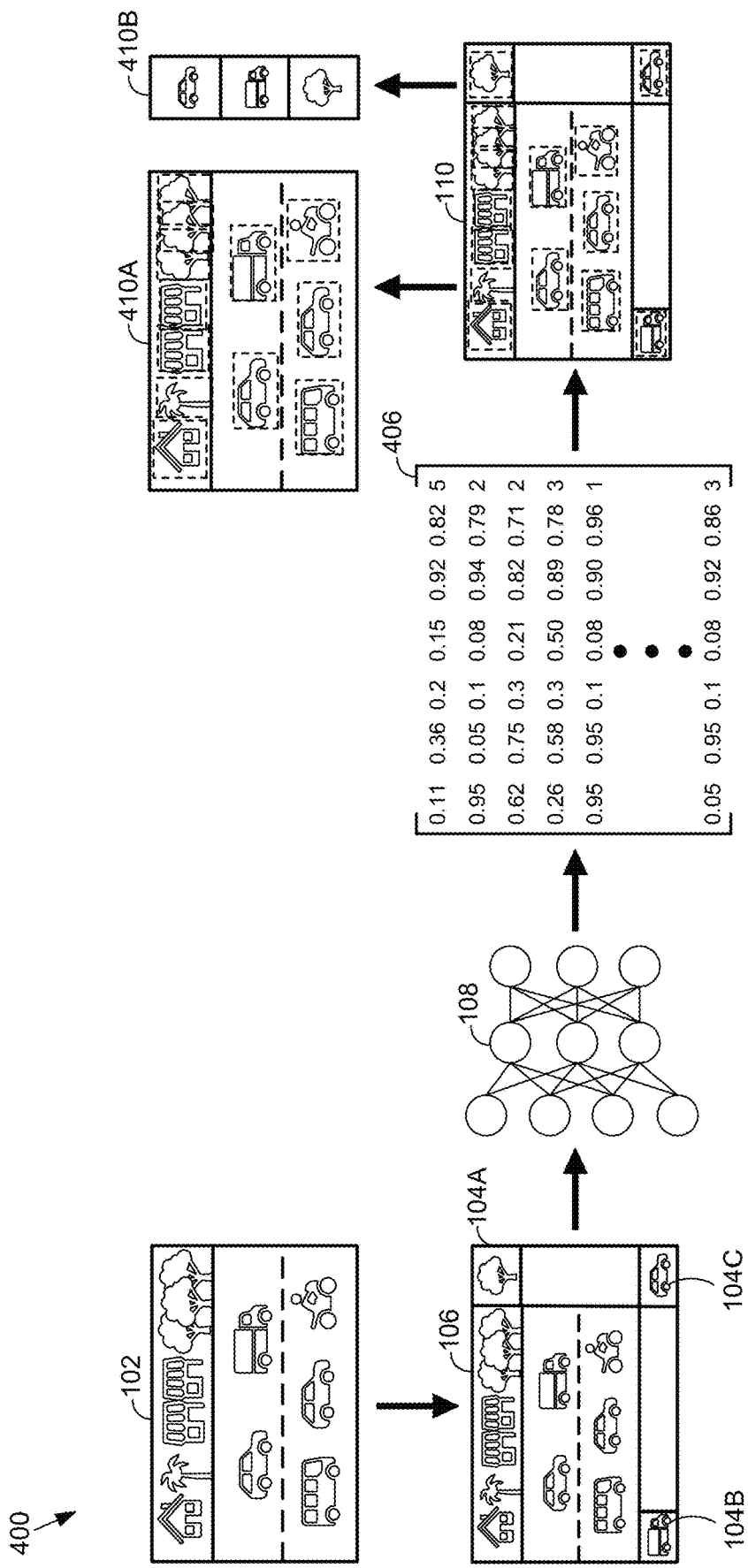
FIG. 4 is an example illustration of a process for analyzing outputs of a network for fault detection, in accordance with some embodiments of the present disclosure.

Now referring to FIG. 4, FIG. 4 is an example illustration of a process for generating outputs using a machine learning model with respect to fault detection, in accordance with some embodiments of the present disclosure. The process 400 may include a visual representation of an instance of the process 100 of FIG. 1 that may be used to apply image data introduced with motifs to the machine learning model(s) 108 to generate outputs corresponding to the original image data and the introduced motifs. As a non-limiting example, the machine learning model(s) 108 in process 400 may be trained for object detection—and specifically for detecting cars, trucks, and trees. The machine learning model(s) 108, during inference, may take as input instances of the combined sensor data 106 corresponding to the sensor data 102 (e.g., image data) representative of an image captured by a sensor of a vehicle—such as the vehicle 1000—combined with motif(s) 104A, 104B, and 104C. The machine learning model(s) 108 may then generate outputs 406 (e.g., pixel by pixel output data with each pixel associated with a value based on the predicted object classification (or empty class), the pixels corresponding to positions or locations with respect to the combined sensor data 106) that may correspond to predictions 410A related to the sensor data 102 and predictions 410B related to the motif(s) 104. The output(s) 110 may include object information (e.g., bounding boxes, class labels, locations) for regions where each object is predicted to be located in the combined sensor data 106.

Although described as separate predictions 410A and 410B, this is not intended to be limiting. In practice, the predictions 410A and 410B may correspond to a single set of predictions, and the fault detector 114 may determine whether the predictions include a subset of predictions 410B corresponding to the motif(s) 104, and whether those predictions 410B are accurate.

Figure 5:
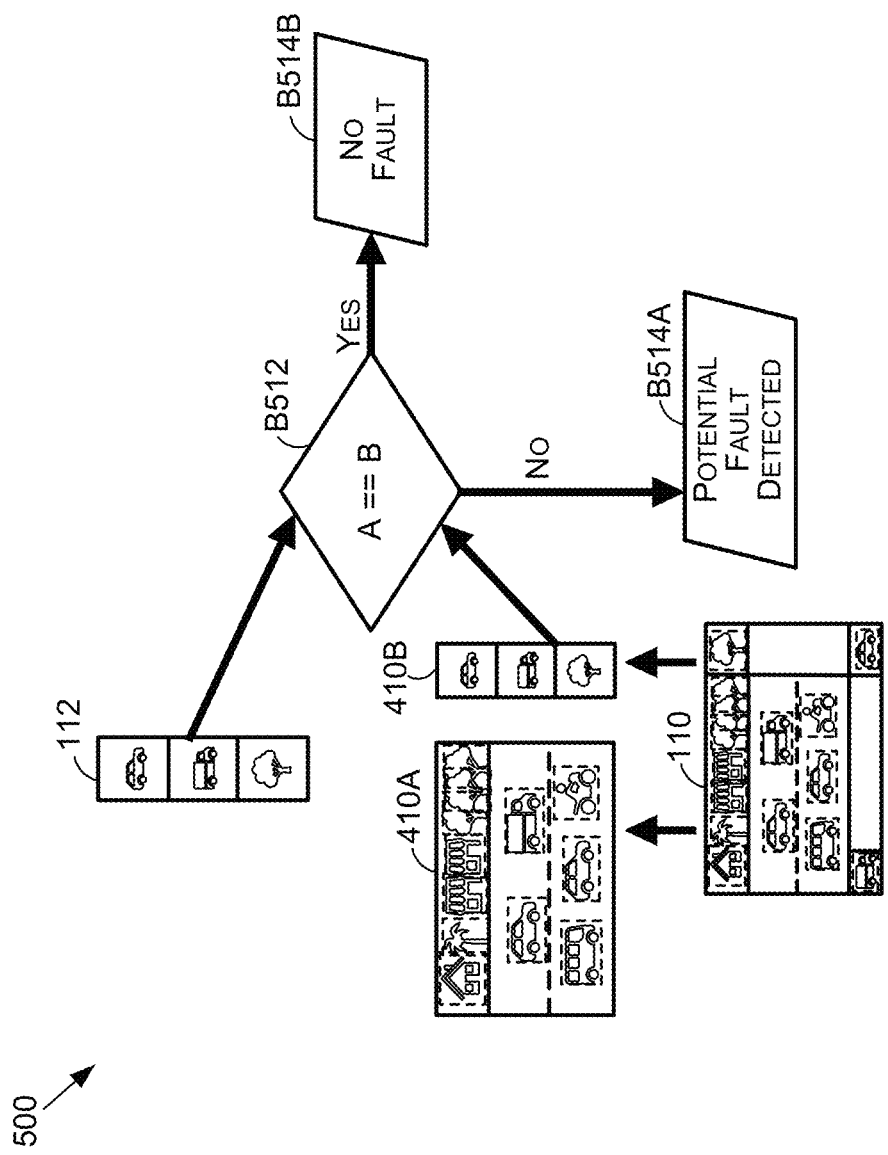
FIG. 5 is an example illustration of a process for detecting faults in a neural network, in accordance with some embodiments of the present disclosure.

Based on the locations (e.g., regions, pixels) where each object is detected, in some examples, the predictions 410B for motif(s) 104 may be compared to the known or actual locations of the motif(s) 104 in the combined sensor data 106 to determine the accuracy of the machine learning model(s) 108 and thus whether or not a fault is present. For example, and with reference to FIG. 5, predictions 410B of the machine learning model(s) 108 may be compared against the expected prediction(s) 112 to determine accuracy of the results of the machine learning model(s) 108. A fault in the machine learning model(s) 108 may be detected at comparison block B512 based on a one-to-one comparison between the expected prediction(s) 112 and the prediction(s) 410B for the motif(s) 104 output by the machine learning model(s) 108. In the non-limiting examples of FIGS. 4 and 5, the expected prediction(s) 112 may include class labels and/or locations of each motif(s) 104 in the combined sensor data 106. The expected prediction(s) 112 for the motif(s) 104A, 104B, and 104C may have been stored when the motif(s) 104A, 104B, and 104C are appended to or otherwise added to the sensor data 102 to generate the combined sensor data 106.

The expected prediction(s) 112 for each motif may be compared against the predictions 410B of the machine learning model(s) 108. If there is a difference (e.g., in location, class label, etc.) between the expected prediction(s) 112 and the prediction(s) 410B with respect to any of the motif(s) 104A, 104B, and 104C, the system may determine that a potential fault is detected (at block B514A) in the machine learning model(s) 108. If the expected prediction(s) 112 matches the prediction(s) 410B for each of the motif(s) 104A, 104B, and 104C, the system may determine that there is no fault (at block B514B) detected in the machine learning model(s) 108. In other examples, the machine learning model(s) 108 may be determined to have a transient fault when an accuracy error is detected (at block B514A). Further, control decisions may be made based on whether or not a fault is detected in the machine learning model(s) 108. In some examples, for each instance of the combined sensor data 106 where no fault is determined, the predictions 410A may be relied upon by the underlying system.

Figure 6:
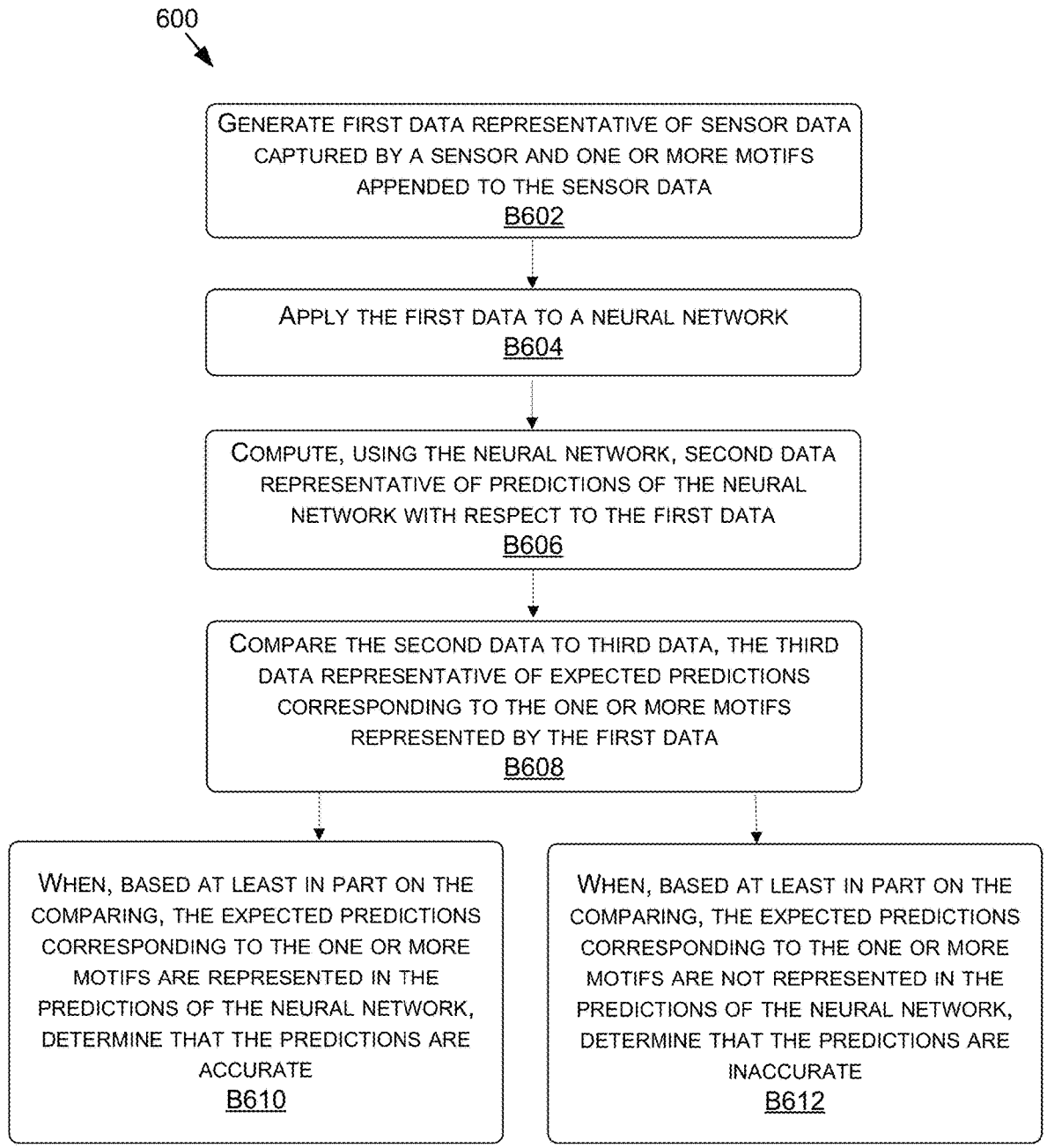
FIG. 6 is a flow diagram showing a method for detecting faults in a neural network using motifs and/or watermarks, in accordance with some embodiments of the present disclosure.

Now referring to FIG. 6, each block of method 600, described herein, comprises a computing process that may be performed using any combination of hardware, firmware, and/or software. For instance, various functions may be carried out by a processor executing instructions stored in memory. The method 600 may also be embodied as computer-usable instructions stored on computer storage media. The method 600 may be provided by a standalone application, a service or hosted service (standalone or in combination with another hosted service), or a plug-in to another product, to name a few. In addition, method 600 is described, by way of example, with respect to the process 100 of FIG. 1. However, this method 600 may additionally or alternatively be executed by any one system or within any one process, or any combination of systems and processes, including, but not limited to, those described herein.

FIG. 6 is a flow diagram showing a method 600 for detecting faults in a neural network using motifs and/or watermarks, in accordance with some embodiments of the present disclosure. The method 600, at block B602, includes generating first data representative of sensor data captured by a sensor and one or more motifs appended to the sensor data. For example, first data (e.g., the combined sensor data 106) may be generated that represents sensor data (e.g., the sensor data 102) and motifs (e.g., the motif(s) 104) appended to the sensor data.

The method 600, at block B604, includes applying the first data to a neural network. For example, the first data (e.g., the combined sensor data 106) may be applied (e.g., as an input) to the machine learning model(s) 108 (e.g., a neural network, such as a DNN).

The method 600, at block B606, includes computing, using the neural network, second data representative of predictions of the neural network with respect to the first data. For example, the machine learning model(s) 108 may compute the output(s) 110 (e.g., class labels, locations, pixels, values, confidences, etc.) associated with predictions of the machine learning model(s) 108.

The method 600, at block B608, includes comparing the second data to third data, the third data representative of expected predictions corresponding to the one or more motifs represented by the first data. For example, the output(s) 110 of the machine learning model(s) 108 may be compared to the expected prediction(s) 112 (e.g., actual locations and/or class labels of the motif(s) 104) by the fault detector 114. The fault detector 114 may compare the output(s) 110 of the machine learning model(s) 108 against the expected prediction(s) 112 for each of the one or more motif(s) 104, for one or more instances of the combined sensor data 106.

The method 600, at block B610, includes determining that the predictions are accurate when, based at least in part on the comparing, the expected predictions are represented in the predictions of the neural network. For example, the fault detector 114 may determine that the predictions (e.g., the output(s) 110) are accurate when the expected prediction(s) 112 are represented in the output(s) 110 of the machine learning model(s) 108. The fault detector 114 may determine that the expected prediction(s) 112 are represented in the output(s) 110 when expected prediction(s) 112 for each of the one or more motif(s) 104 is found in the output(s) 110, or when a threshold similarity is determined (e.g., for object detection, so long as predicted locations of vertices of a bounding shape are within 95% accuracy, 98% accuracy, etc., with respect to the expected prediction(s) 112).

The method 600, at block B612, includes determining that the predictions are inaccurate when, based at least in part on the comparing, the expected predictions are not represented in the predictions of the neural network. For example, the fault detector 114 may determine that the predictions (e.g., the output(s) 110) are inaccurate when the expected prediction(s) 112 are not represented in the output(s) 110 of the machine learning model(s) 108. The fault detector 114 may determine that the expected prediction(s) 112 are not represented in the output(s) 110 when the expected prediction(s) 112 for at least one of the one or more motif(s) 104 is not found in the output(s) 110, or is outside of a threshold similarity to the expected prediction(s) 112.

Permanent Fault Detection Method

For detecting permanent faults, input data representative of a signature image may be provided as input to a deep neural network (DNN), where the DNN is either trained to predict a certain signature with respect to the signature image, or is trained to make predictions for images similar to the signature image, such that an expected signature is known. In such embodiments, the signature image may be applied to the DNN intermittently, and the predicted signature may be compared against the expected signature to determine whether a fault is detected.

In embodiments, to detect permanent fault(s) in a DNN, sensor data (e.g., images, videos, depth maps, etc.) may be received from sensors (e.g., cameras, LIDAR sensors, RADAR sensors, etc.). In non-limiting examples corresponding to autonomous vehicles, the sensors may be disposed on or otherwise associated with an autonomous or semi-autonomous vehicle. The sensor data captured may be applied to a DNN—e.g., as a sequence of images, as a sequence of depth maps, etc. In some embodiments, intermittently, while applying the sensor data to the neural network, a signature image (e.g., an image including motifs, a stock image, a logo, etc.) may be applied to the DNN. For example, the signature image may be applied at an interval, every x number of images, randomly, and/or the like. At an iteration where a signature image is applied, the actual predictions of the DNN may be compared to an expected prediction of the DNN with respect to the signature image.

Accuracy of the predictions of the DNN may be determined based on the comparison of the expected prediction to the actual prediction. For example, the expected prediction may include a signature, which may be known to a fault detector, and the output signature of the DNN may be compared to this signature. In some examples, a threshold may be used such that predictions of the DNN with respect the signature image should be within a threshold similarity to the expected predictions. When the output of the DNN is determined to be inaccurate, hardware and/or software corresponding to processing of the DNN may be considered to have a permanent fault. In such examples, corrective measures may be taken, such as to hand over the control of the vehicle to the driver, perform a safety maneuver, and/or to offload or transfer processing of the DNN to other components—e.g., a redundant architecture.

Figure 7:
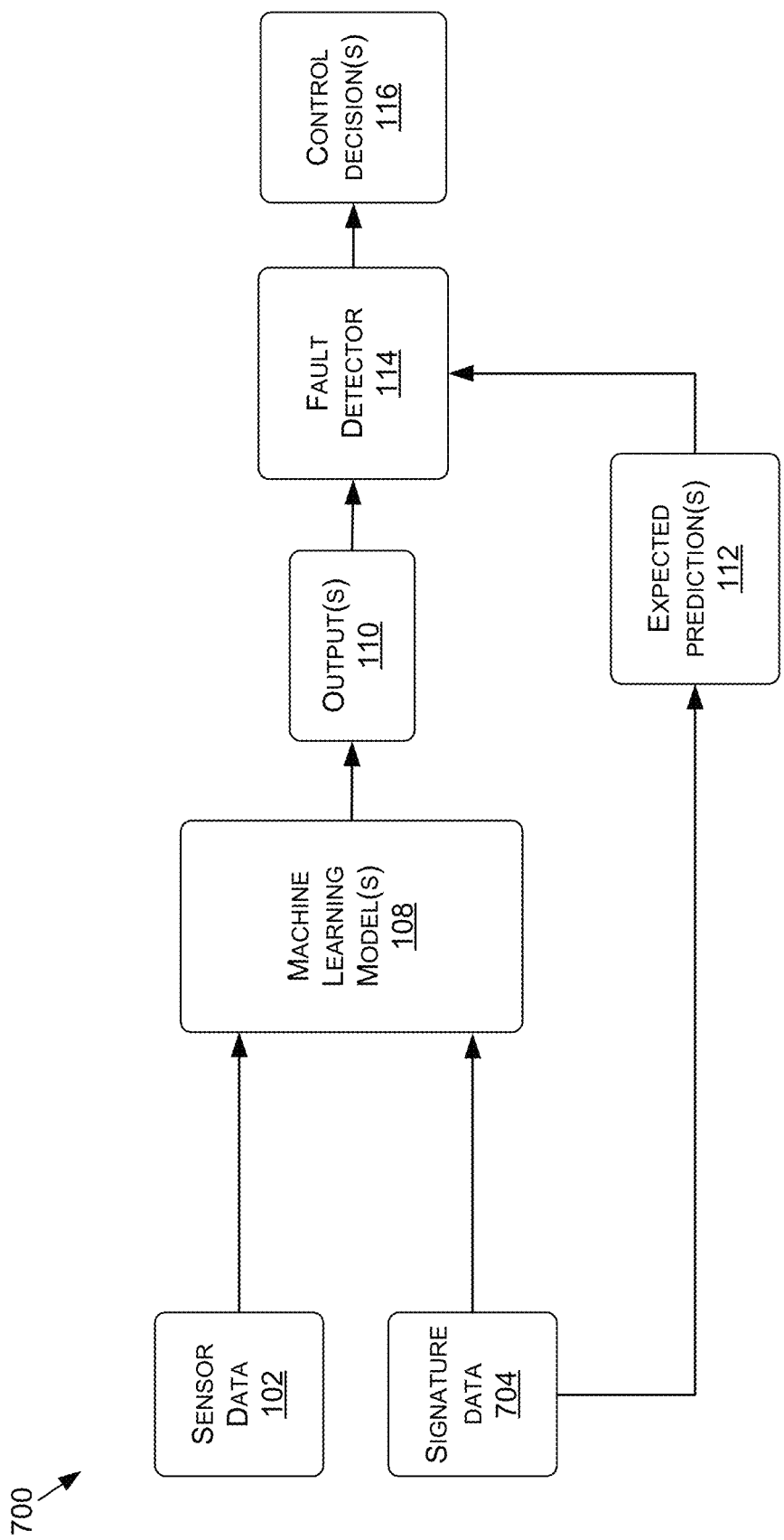
FIG. 7 is an example data flow diagram illustrating a process for detecting faults in a neural network, in accordance with some embodiments of the present disclosure.

With reference to FIG. 7, FIG. 7 is an example data flow diagram illustrating a process 700 for detecting faults in a neural network using signatures, in accordance with some embodiments of the present disclosure. The process 700 may be used for detecting permanent faults in any machine learning model(s) 108, such as but not limited to those described herein. In addition, as described herein, the process 700 is not limited to detecting only permanent faults, and may be used to detect other types of faults without departing from the scope of the present disclosure—such as transient or intermittent faults. The machine learning model(s) 108 may receive, as input, the sensor data 102, which may be similar to the sensor data 102 described herein. Although the sensor data 102 is primarily discussed with respect to image data representative of image(s), this is not intended to be limiting. In some embodiments, for example, the sensor data 102 may include data from one or more LIDAR sensors, RADAR sensors, SONAR sensors, ultrasonic sensors, IMU sensors, and/or other sensor types (e.g., sensors and/or cameras described with respect to FIGS. 10A-10C).

The sensor data 102 used as input for the machine learning model(s) 108 may include original images (e.g., as captured by one or more image sensors), down-sampled images, up-sampled images, cropped or region of interest (ROI) images, labeled images annotated for or outputted from other systems, flipped on an axis or otherwise augmented images, or a combination thereof. The sensor data

102 may represent, in some non-limiting embodiments, images captured by one or more sensors (e.g., cameras of a vehicle 1000), and/or may represent images captured from within a virtual environment used for testing and/or generating training images (e.g., a virtual camera of a virtual vehicle within a virtual or simulated environment). In some examples, the sensor data 102 may be applied to the machine learning model(s) 108 as a sequence of images, a sequence of depth maps, and/or a sequence of another sensor data representation.

Intermittently, while applying the sensor data 102 to the machine learning model(s), signature data 704 may be applied to the machine learning model(s) 108. The signature data 704 may be representative of a signature image (e.g., an image including motifs, a stock image, a logo, etc.) that may be entirely different from or may be similar to the patterns (e.g., objects, lanes, lines, etc.) that the machine learning model(s) 108 is trained to predict. The signature data 704 may be applied to the machine learning model(s) 108 at a fixed or varied interval within the sequence of the sensor data 102. For example, the signature data 704 may be applied at an interval, every x number of images, randomly, and/or the like. The signature data 704 may include one or more signature images. At each iteration, the same or a different signature image may be applied to the machine learning model(s) 108. For example, where different signature images are applied, any number of signature images and corresponding expected prediction(s) 112 may be stored, and the signature images may be applied to the machine learning model(s) 108 in order, randomly, and/or the like.

The machine learning model(s) 108 may be any machine learning model (e.g., neural network, DNN, CNN, etc.) that is trained to make predictions based on sensor data 102 (or other data types, as described herein). The machine learning model(s) 108 may be configured to generate output(s) 110 based on the sensor data 102 and the signature data 704—separately, in embodiments. For example, in some embodiments, the machine learning model(s) 108 may be trained to predict a certain (e.g., expected) signature with respect to a signature image(s) of the signature data 704 and may be trained to compute different predictions with respect to the sensor data 102. In such examples, training the machine learning model(s) 108 may include using a first loss function with respect to the signature data 704 and a second loss function with respect to the sensor data 102. In other examples, the machine learning model(s) 108 may be trained to predict certain signature(s) for images similar to a signature image of the signature data 704. In both examples, the expected prediction(s) 112 may be stored for the signature data 704 such that the fault detector 114 may compare the output(s) 110 to the expected prediction(s) 112. In some examples, a placement (e.g., an image number, an interval of images, etc.) of the signature image(s) within the sequence of the sensor data 102 may also be stored to aid the fault detector 114 in determining which output(s) 110 correspond to the signature data 704.

At instances where the signature data 704 is applied, the machine learning model(s) 108 may take as input the signature data 704 and generate the output(s) 110 corresponding thereto. These output(s) 110 may be compared by the fault detector 114 with the expected prediction(s) 112 for the signature data 704 to determine whether a fault is present. The fault detector 114 may, in some non-limiting embodiments, use information corresponding to the signature data 704 (e.g., placement within the sequence, type of signature expected to be output, etc.) to check against the output(s) 110 computed by the machine learning model(s) 108. The comparison may include comparing expected signatures to predicted signatures to ensure that the output(s) 110 at least include accurate (e.g., within a threshold) prediction(s) (e.g., as compared to expected prediction(s) 112) with respect to the signature data 704.

Based on the comparison, the accuracy or resiliency of the machine learning model(s) 108 may be determined, such as by identifying if the predictions or output(s) 110 of the machine learning model(s) 108 do not correspond to the expected signatures known to the fault detector 114, or the predictions are outside of a threshold accuracy with respect to the expected signature information. In some examples, when the expected predictions(s) 112 for each iteration of signature data 704 is represented in the output(s) 110, the fault detector 114 may determine that the predictions of the machine learning model(s) 108 are accurate and the underlying software and/or hardware corresponding to the machine learning model(s) 108 does not have a fault. Similarly, when the expected predictions(s) 112 for each iteration of signature data 704 is not represented in the output(s) 110, the fault detector 114 may determine that the predictions of the machine learning model(s) 108 are inaccurate and that the underlying software and/or hardware corresponding to the machine learning model(s) 108 has a fault(s).

Once a fault or no-fault determination is made, this information may be passed to one or more components of the system to make control decision(s) 116. For example, where the system is the vehicle 1000, described herein, the fault determination may be passed to one or more layers of an autonomous driving software stack to determine an appropriate control decision(s) 116. For example, where predictions are outside of a threshold accuracy with respect to the signature data 704, some or all of the output(s) 110 of the machine learning model(s) 108 may be skipped over or disregarded with respect to one or more of the control decision(s) 116. In some examples, such as where the predictions of the machine learning model(s) 108 are inaccurate and unusable for safe operation of the vehicle 1000, the control decision(s) 116 may include handing control back to a driver (e.g., exiting autonomous or semi-autonomous operation), or executing an emergency or safety maneuver (e.g., coming to a stop, pulling to the side of the road, or a combination thereof). Because the type of fault may be a permanent fault, an indicator or signal may be generated that indicates diagnostics or testing need to be performed before further operation—at least with respect to the functionality(ies) that the machine learning model(s) 108 influences—is allowed. In examples where there are no faults detected, the control decision(s) 116 may still be impacted by this information. For example, certain functions or features of the autonomous driving software stack may not be relied upon or used without an indication or signal being received (e.g., at each iteration, at an interval, etc.) indicating that the machine learning model(s) 108 is working properly. In some examples, the process 100 may be executed on any number of machine learning model(s) 108 operating within a system. For example, an autonomous driving software stack may rely on hundreds or thousands of machine learning model(s) 108 for effective and safe operation, and any number of these may be subject to the process 700 in order to ensure faults do not interfere with the safe and effective operation. As such, as described herein, the accuracy of the output(s) 110 may be separately determined for any number of different operations corresponding to one or more layers of the drive stack, using one or more machine learning model(s) 108.

Figure 8C:
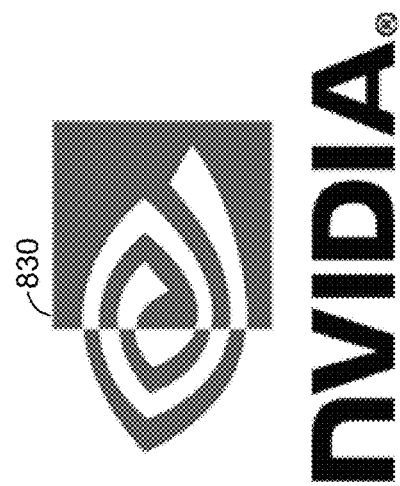
FIGS. 8A-8C include example illustrations of signature inputs used to determine faults in neural networks, in accordance with some embodiments of the present disclosure.
Figure 8B:
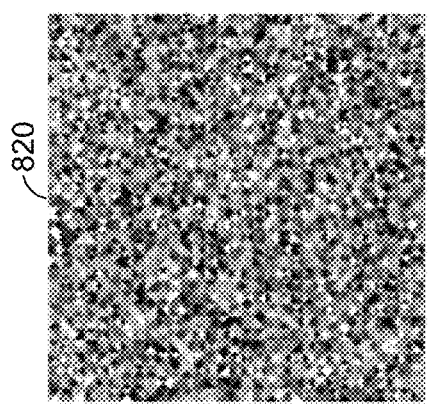
Figure 8A:
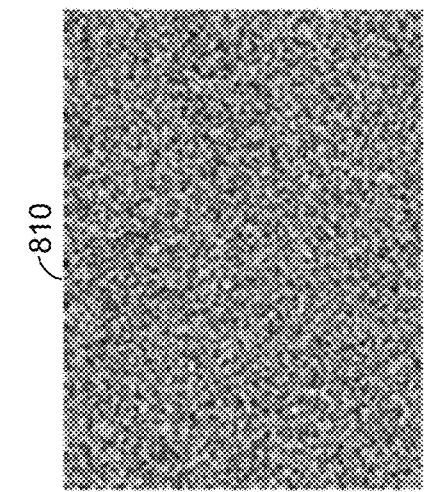

Now referring to FIGS. 8A-8C, FIGS. 8A-8C are example illustrations of signature inputs to determine faults in neural networks, in accordance with some embodiments of the present disclosure. For example, the signature images (e.g., signature images 810, 820, and/or 830) may be applied—intermittently, in embodiments—to the machine learning model(s) 108 in place of the sensor data 102 to test for faults in the underlying software and/or hardware executing the machine learning model(s) 108. For example, the signature image(s) may be applied to the machine learning model(s) 108 at an interval, every x number of images, randomly, and/or the like. At an iteration where a signature image is applied, the actual predictions of the DNN may be compared to an expected prediction of the DNN with respect to the signature image.

The machine learning model(s) may be either trained to predict the signatures with respect to the signature images, or may be trained to make predictions for images similar to the signature images, such that an expected signature is known. The machine learning model(s) 108 may be trained to make predictions for any number of signature images. For non-limiting examples, the machine learning model(s) 108 may be trained to predict a signature with respect to the image 810 of FIG. 8A, or may be trained to predict signatures with respect to each of the images 810, 820, or 830. Where more than one signature image type is used, the fault coverage may be increased as different portions of the underlying software and/or hardware may be involved in the processing with respect to different signature images. The images 810, 820, and 830 are merely examples, and are not intended to be limiting. The signature images may include any image type, or may include another type of sensor data representation or other data type representation (e.g., financial data).

Figure 9:
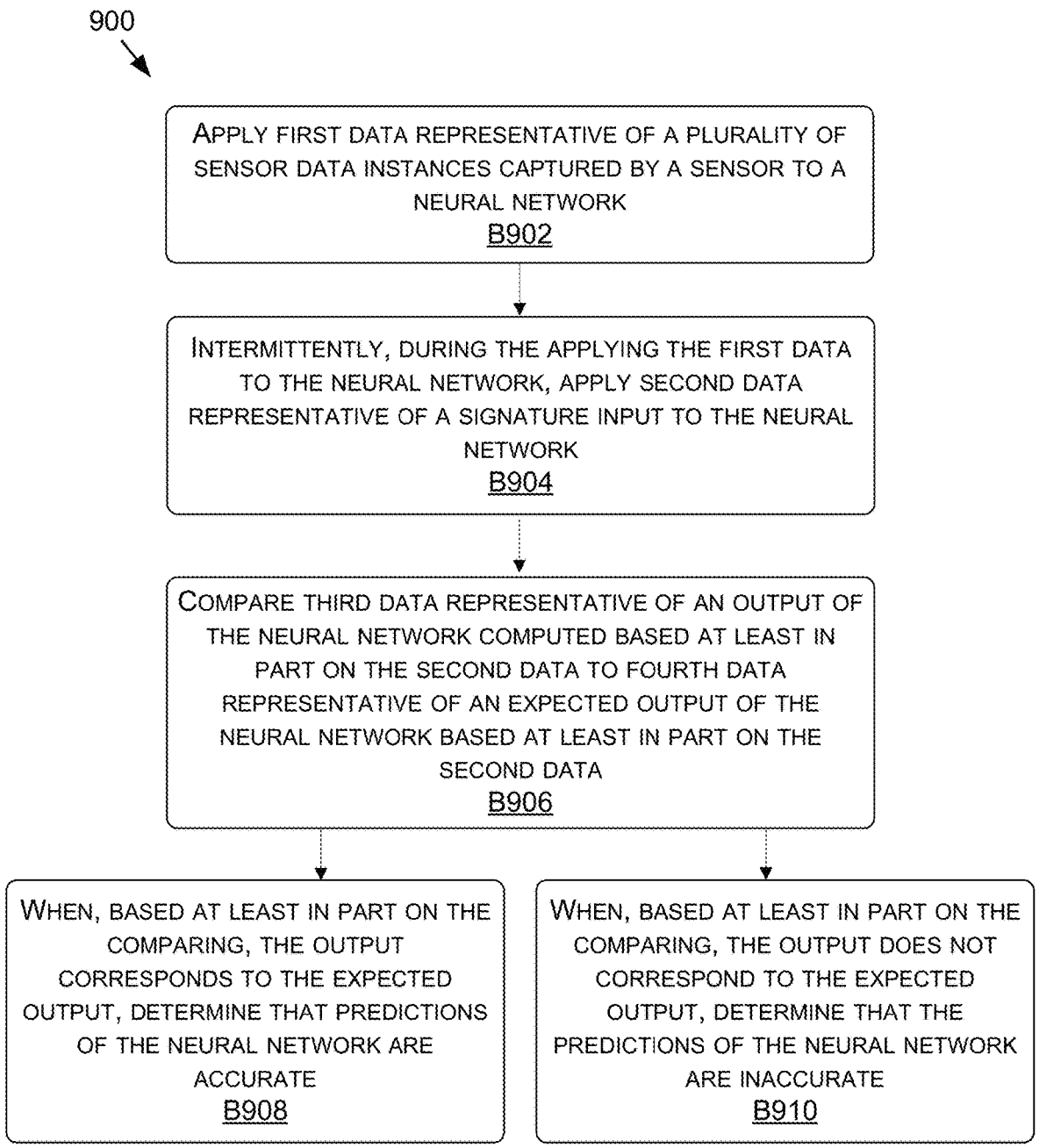
FIG. 9 is a flow diagram showing a method for detecting faults in a neural network using signatures, in accordance with some embodiments of the present disclosure.

Now referring to FIG. 9, each block of method 900, described herein, comprises a computing process that may be performed using any combination of hardware, firmware, and/or software. For instance, various functions may be carried out by a processor executing instructions stored in memory. The method 900 may also be embodied as computer-usable instructions stored on computer storage media. The method 900 may be provided by a standalone application, a service or hosted service (standalone or in combination with another hosted service), or a plug-in to another product, to name a few. In addition, method 900 is described, by way of example, with respect to the process 700 of FIG. 7. However, this method 900 may additionally or alternatively be executed by any one system or within any one process, or any combination of systems or processes, including, but not limited to, those described herein.

FIG. 9 is a flow diagram showing a method 900 for detecting faults in a neural network using signature images, in accordance with some embodiments of the present disclosure. The method 900, at block B902, includes applying first data representative of a plurality of sensor data instances captured by a sensor to a neural network. For example, first data that represents sensor data (e.g., the sensor data 102) may be applied (e.g., as an input) to the machine learning model(s) 108 (e.g., a neural network, such as a DNN).

The method 900, at block B904, includes intermittently, during the applying the first data to the neural network, applying second data representative of a signature input to the neural network. For example, a signature input (e.g., the signature data 704) may be applied to the machine learning model(s) 108 intermittently while applying the sensor data 102 to the machine learning model(s) 108.

The method 900, at block B906, includes comparing third data representative of an output of the neural network computed based at least in part on the second data to fourth data representative of an expected output of the neural network based at least in part on the second data. For example, the output(s) 110 of the machine learning model(s) 108 may be compared to the expected prediction(s) 112 (e.g., expected output), the expected prediction(s) 112 including an expected prediction for the signature input. The fault detector 114 may compare the output(s) 110 against the expected prediction(s) 112 for the signature data 704.

The method 900, at block B908, includes determining that predictions of the neural network are accurate when, based at least in part on the predictions, the output corresponds to the expected output. For example, the fault detector 114 may determine that the predictions (e.g., output(s) 110) of the machine learning model(s) 108 are accurate if the output(s) 110 corresponds to the expected prediction(s) 112. The fault detector 114 may determine that the predictions are accurate when the output(s) 110 includes the expected prediction(s) 112 for the signature data 704.

The method 900, at block B910, includes determining that predictions of the neural network are inaccurate when, based at least in part on the predictions, the output does not correspond to the expected output. For example, the fault detector 114 may determine that the predictions (e.g., output(s) 110) of the machine learning model(s) 108 are inaccurate if the output(s) 110 does not correspond to the expected prediction(s) 112. The fault detector 114 may determine that the predictions are inaccurate when the output(s) 110 does not include the expected prediction(s) 112 for the signature data 704.

Example Autonomous Vehicle

Figure 10A:
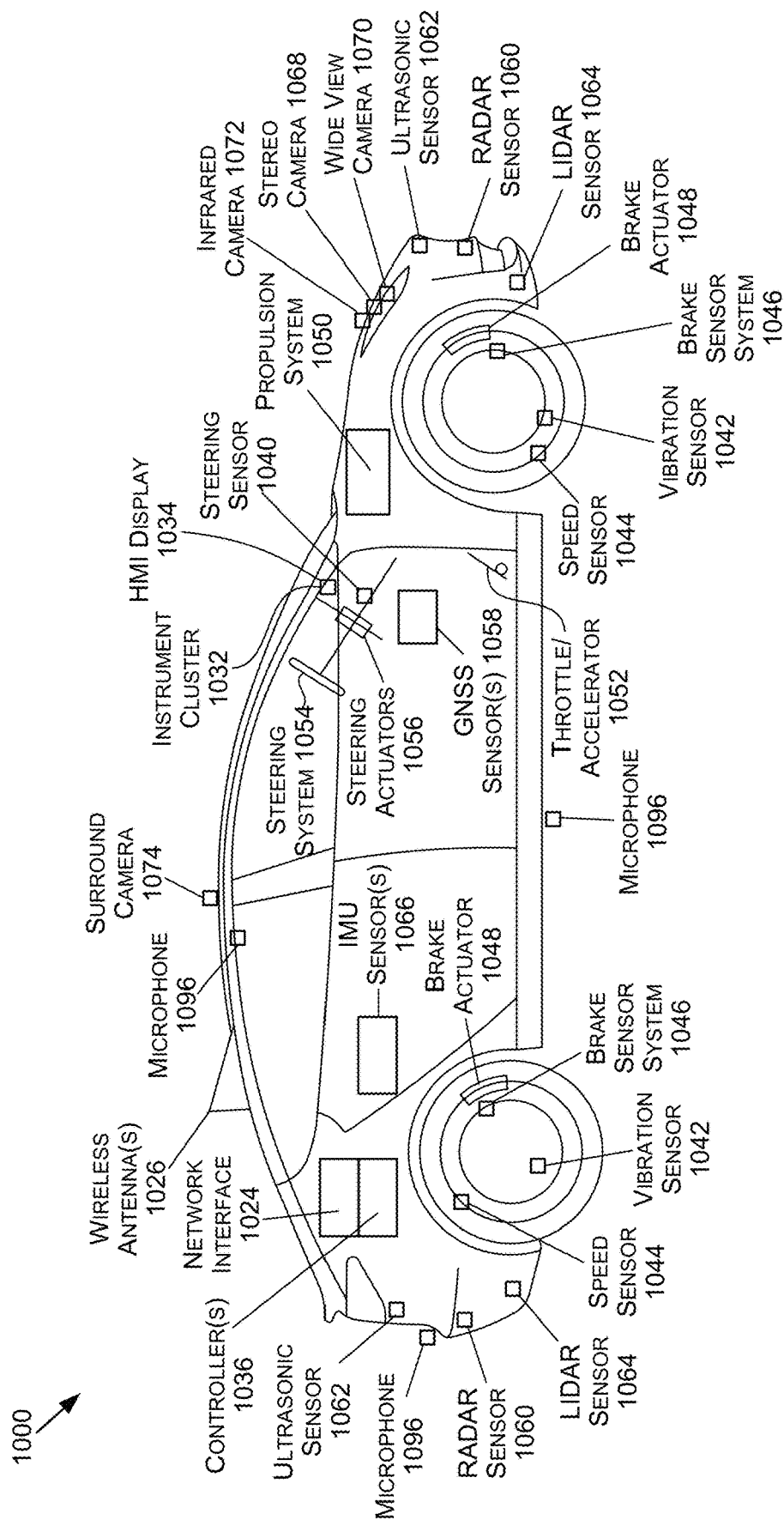
FIG. 10A is an illustration of an example autonomous vehicle, in accordance with some embodiments of the present disclosure.

FIG. 10A is an illustration of an example autonomous vehicle 1000, in accordance with some embodiments of the present disclosure. As described herein, in some non-limiting embodiments, such as where the machine learning model(s) 108 are included within an autonomous driving software stack, the vehicle 1000 may represent the underlying system executing testing of the machine learning model(s) 108. For example, the vehicle 1000 may execute built-in self-test (BIST) during deployment, and the testing of the machine learning model(s) 100 according to the processes 100 and 700 may be included within the BIST of the vehicle 1000. The autonomous vehicle 1000 (alternatively referred to herein as the "vehicle 1000") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1000 may be capable of functionality in accordance with one or more of Level 3-Level 5 of the autonomous driving levels. For example, the vehicle 1000 may be capable of conditional automation (Level 3), high automation (Level 4), and/or full automation (Level 5), depending on the embodiment.

The vehicle 1000 may include components such as a chassis, a vehicle body, wheels (e.g., 2, 4, 6, 8, 18, etc.), tires, axles, and other components of a vehicle. The vehicle 1000 may include a propulsion system 1050, such as an internal combustion engine, hybrid electric power plant, an all-electric engine, and/or another propulsion system type. The propulsion system 1050 may be connected to a drive train of the vehicle 1000, which may include a transmission, to enable the propulsion of the vehicle 1000. The propulsion system 1050 may be controlled in response to receiving signals from the throttle/accelerator 1052.

A steering system 1054, which may include a steering wheel, may be used to steer the vehicle 1000 (e.g., along a desired path or route) when the propulsion system 1050 is operating (e.g., when the vehicle is in motion). The steering system 1054 may receive signals from a steering actuator 1056. The steering wheel may be optional for full automation (Level 5) functionality.

The brake sensor system 1046 may be used to operate the vehicle brakes in response to receiving signals from the brake actuators 1048 and/or brake sensors.

Controller(s) 1036, which may include one or more system on chips (SoCs) 1004 (FIG. 10C) and/or GPU(s), may provide signals (e.g., representative of commands) to one or more components and/or systems of the vehicle 1000. For example, the controller(s) may send signals to operate the vehicle brakes via one or more brake actuators 1048, to operate the steering system 1054 via one or more steering actuators 1056, to operate the propulsion system 1050 via one or more throttle/accelerators 1052. The controller(s) 1036 may include one or more onboard (e.g., integrated) computing devices (e.g., supercomputers) that process sensor signals, and output operation commands (e.g., signals representing commands) to enable autonomous driving and/or to assist a human driver in driving the vehicle 1000. The controller(s) 1036 may include a first controller 1036 for autonomous driving functions, a second controller 1036 for functional safety functions, a third controller 1036 for artificial intelligence functionality (e.g., computer vision), a fourth controller 1036 for infotainment functionality, a fifth controller 1036 for redundancy in emergency conditions, and/or other controllers. In some examples, a single controller 1036 may handle two or more of the above functionalities, two or more controllers 1036 may handle a single functionality, and/or any combination thereof.

The controller(s) 1036 may provide the signals for controlling one or more components and/or systems of the vehicle 1000 in response to sensor data received from one or more sensors (e.g., sensor inputs). The sensor data may be received from, for example and without limitation, global navigation satellite systems sensor(s) 1058 (e.g., Global Positioning System sensor(s)), RADAR sensor(s) 1060, ultrasonic sensor(s) 1062, LIDAR sensor(s) 1064, inertial measurement unit (INU) sensor(s) 1066 (e.g., accelerometer(s), gyroscope(s), magnetic compass(es), magnetometer(s), etc.), microphone(s) 1096, stereo camera(s) 1068, wide-view camera(s) 1070 (e.g., fisheye cameras), infrared camera(s) 1072, surround camera(s) 1074 (e.g., 360 degree cameras), long-range and/or mid-range camera(s) 1098, speed sensor(s) 1044 (e.g., for measuring the speed of the vehicle 1000), vibration sensor(s) 1042, steering sensor(s) 1040, brake sensor(s) (e.g., as part of the brake sensor system 1046), and/or other sensor types.

One or more of the controller(s) 1036 may receive inputs (e.g., represented by input data) from an instrument cluster 1032 of the vehicle 1000 and provide outputs (e.g., represented by output data, display data, etc.) via a human-machine interface (HMI) display 1034, an audible annunciator, a loudspeaker, and/or via other components of the vehicle 1000. The outputs may include information such as vehicle velocity, speed, time, map data (e.g., the HD map 1022 of FIG. 10C), location data (e.g., the vehicle's 1000 location, such as on a map), direction, location of other vehicles (e.g., an occupancy grid), information about objects and status of objects as perceived by the controller(s) 1036, etc. For example, the HMI display 1034 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1000 further includes a network interface 1024 which may use one or more wireless antenna(s) 1026 and/or modem(s) to communicate over one or more networks. For example, the network interface 1024 may be capable of communication over LTE, WCDMA, UMTS, GSM, CDMA2000, etc. The wireless antenna(s) 1026 may also enable communication between objects in the environment (e.g., vehicles, mobile devices, etc.), using local area network(s), such as Bluetooth, Bluetooth LE, Z-Wave, Zig-Bee, etc., and/or low power wide-area network(s) (LP-WANs), such as LoRaWAN, SigFox, etc.

Figure 10B:
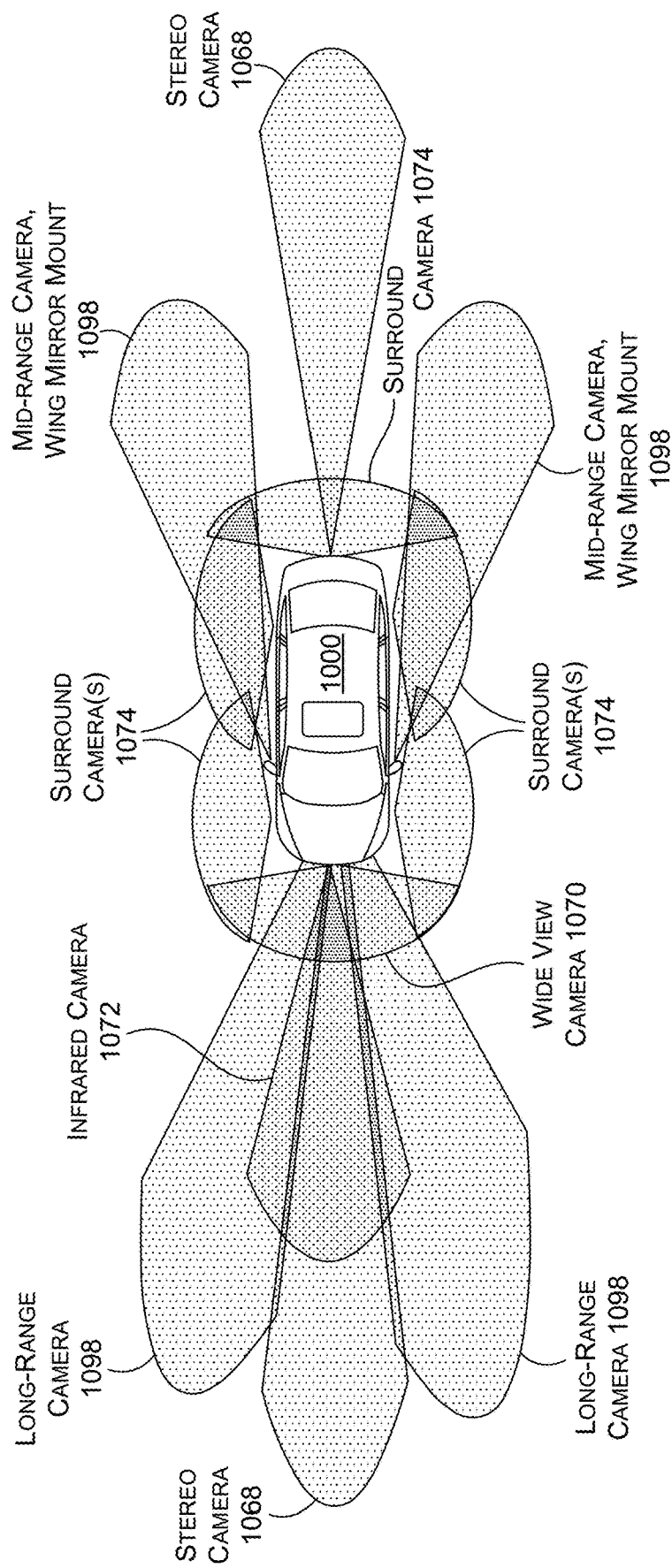
FIG. 10B is an example of camera locations and fields of view for the example autonomous vehicle of FIG. 10A, in accordance with some embodiments of the present disclosure.

FIG. 10B is an example of camera locations and fields of view for the example autonomous vehicle 1000 of FIG. 10A, in accordance with some embodiments of the present disclosure. The cameras and respective fields of view are one example embodiment and are not intended to be limiting. For example, additional and/or alternative cameras may be included and/or the cameras may be located at different locations on the vehicle 1000.

The camera types for the cameras may include, but are not limited to, digital cameras that may be adapted for use with the components and/or systems of the vehicle 1000. The camera(s) may operate at automotive safety integrity level (ASTL) B and/or at another ASTL. The camera types may be capable of any image capture rate, such as 60 frames per second (fps), 1020 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1000 (e.g., front-facing cameras) may be used for surround view, to help identify forward facing paths and obstacles, as well aid in, with the help of one or more controllers 1036 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1070 that may be used to perceive objects coming into view from the periphery (e.g., pedestrians, crossing traffic or bicycles). Although only one wide-view camera is illustrated in FIG. 10B, there may any number of wide-view cameras 1070 on the vehicle 1000. In addition, long-range camera(s) 1098 (e.g., a long-view stereo camera pair) may be used for depth-based object detection, especially for objects for which a neural network has not yet been trained. The long-range camera(s) 1098 may also be used for object detection and classification, as well as basic object tracking.

One or more stereo cameras 1068 may also be included in a front-facing configuration. The stereo camera(s) 1068 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1068 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1068 may be used in addition to, or alternatively from, those described herein.

Cameras with a field of view that include portions of the environment to the side of the vehicle 1000 (e.g., side-view cameras) may be used for surround view, providing information used to create and update the occupancy grid, as well as to generate side impact collision warnings. For example, surround camera(s) 1074 (e.g., four surround cameras 1074 as illustrated in FIG. 10B) may be positioned to on the vehicle 1000. The surround camera(s) 1074 may include wide-view camera(s) 1070, fisheye camera(s), 360 degree camera(s), and/or the like. Four example, four fisheye cameras may be positioned on the vehicle's front, rear, and sides. In an alternative arrangement, the vehicle may use three surround camera(s) 1074 (e.g., left, right, and rear), and may leverage one or more other camera(s) (e.g., a forward-facing camera) as a fourth surround view camera.

Cameras with a field of view that include portions of the environment to the rear of the vehicle 1000 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1098, stereo camera(s) 1068), infrared camera(s) 1072, etc.), as described herein.

Figure 10C:
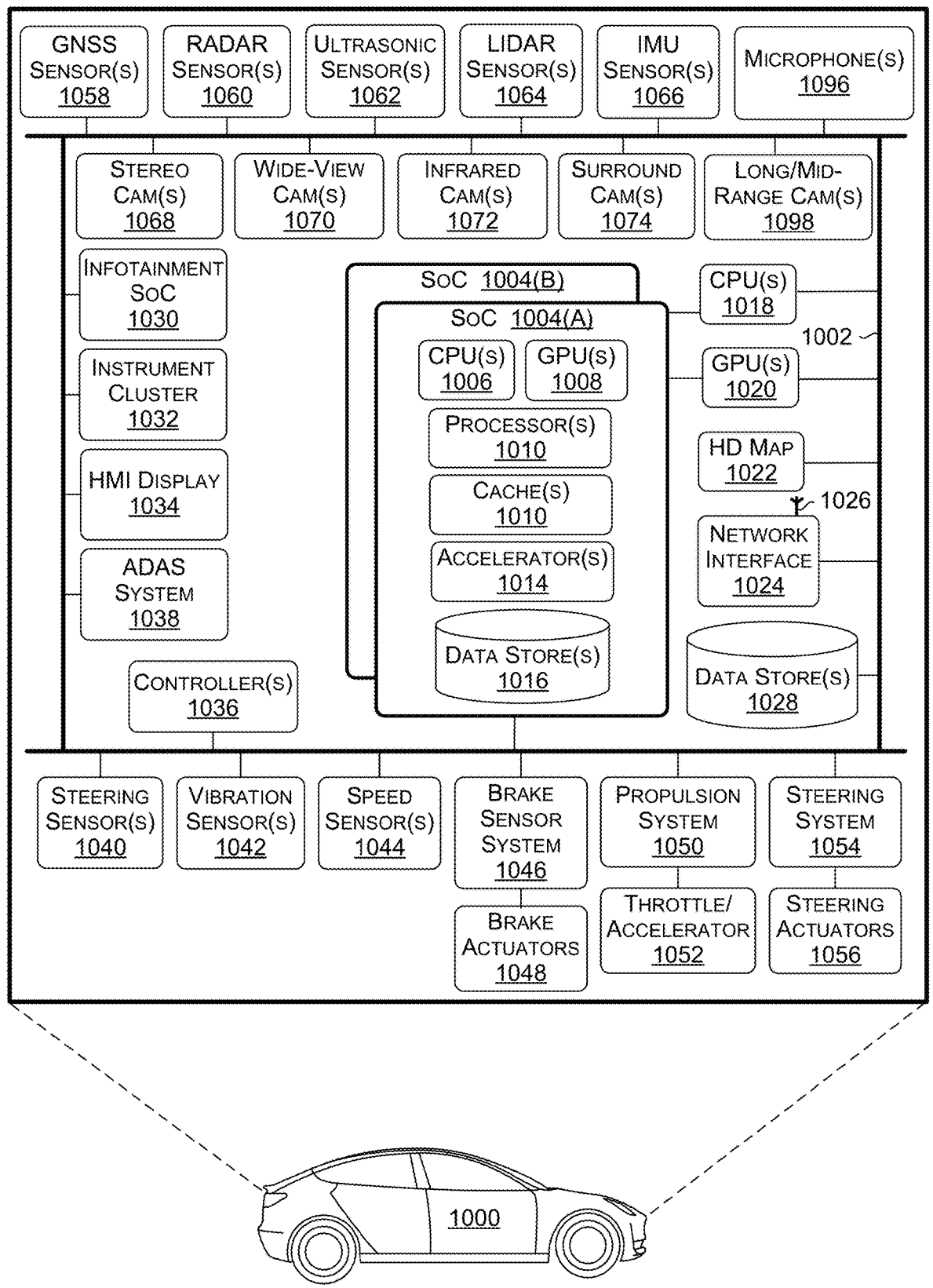
FIG. 10C is a block diagram of an example system architecture for the example autonomous vehicle of FIG. 10A, in accordance with some embodiments of the present disclosure.

FIG. 10C is a block diagram of an example system architecture for the example autonomous vehicle 1000 of FIG. 10A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1000 in FIG. 10C are illustrated as being connected via bus 1002. The bus 1002 may include a Controller Area Network (CAN) data interface (alternatively referred to herein as a "CAN bus"). A CAN may be a network inside the vehicle 1000 used to aid in control of various features and functionality of the vehicle 1000, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1002 is described herein as being a CAN bus, this is not intended to be limiting. For example, in addition to, or alternatively from, the CAN bus, FlexRay and/or Ethernet may be used. Additionally, although a single line is used to represent the bus 1002, this is not intended to be limiting. For example, there may be any number of busses 1002, which may include one or more CAN busses, one or more FlexRay busses, one or more Ethernet busses, and/or one or more other types of busses using a different protocol. In some examples, two or more busses 1002 may be used to perform different functions, and/or may be used for redundancy. For example, a first bus 1002 may be used for collision avoidance functionality and a second bus 1002 may be used for actuation control. In any example, each bus 1002 may communicate with any of the components of the vehicle 1000, and two or more busses 1002 may communicate with the same components. In some examples, each SoC 1004, each controller 1036, and/or each computer within the vehicle may have access to the same input data (e.g., inputs from sensors of the vehicle 1000), and may be connected to a common bus, such the CAN bus.

The vehicle 1000 may include one or more controller(s) 1036, such as those described herein with respect to FIG. 10A. The controller(s) 1036 may be used for a variety of functions. The controller(s) 1036 may be coupled to any of the various other components and systems of the vehicle 1000, and may be used for control of the vehicle 1000, artificial intelligence of the vehicle 1000, infotainment for the vehicle 1000, and/or the like.

The vehicle 1000 may include a system(s) on a chip (SoC) 1004. The SoC 1004 may include CPU(s) 1006, GPU(s) 1008, processor(s) 1010, cache(s) 1012, accelerator(s) 1014, data store(s) 1016, and/or other components and features not illustrated. The SoC(s) 1004 may be used to control the vehicle 1000 in a variety of platforms and systems. For example, the SoC(s) 1004 may be combined in a system (e.g., the system of the vehicle 1000) with an HD map 1022 which may obtain map refreshes and/or updates via a network interface 1024 from one or more servers (e.g., server(s) 1078 of FIG. 10D).

The CPU(s) 1006 may include a CPU cluster or CPU complex (alternatively referred to herein as a "CCPLEX"). The CPU(s) 1006 may include multiple cores and/or L2 caches. For example, in some embodiments, the CPU(s) 1006 may include eight cores in a coherent multi-processor configuration. In some embodiments, the CPU(s) 1006 may include four dual-core clusters where each cluster has a dedicated L2 cache (e.g., a 2 MB L2 cache). The CPU(s) 1006 (e.g., the CCPLEX) may be configured to support simultaneous cluster operation enabling any combination of the clusters of the CPU(s) 1006 to be active at any given time.

The CPU(s) 1006 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1006 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1008 may include an integrated GPU (alternatively referred to herein as an "iGPU"). The GPU(s) 1008 may be programmable and may be efficient for parallel workloads. The GPU(s) 1008, in some examples, may use an enhanced tensor instruction set. The GPU(s) 1008 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1008 may include at least eight streaming microprocessors. The GPU(s) 1008 may use compute application programming interface(s) (API(s)). In addition, the GPU(s) 1008 may use one or more parallel computing platforms and/or programming models (e.g., NVIDIA's CUDA).

The GPU(s) 1008 may be power-optimized for best performance in automotive and embedded use cases. For example, the GPU(s) 1008 may be fabricated on a Fin field-effect transistor (FinFET). However, this is not intended to be limiting and the GPU(s) 1008 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1008 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1008 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1008 to access the CPU(s) 1006 page tables directly. In such examples, when the GPU(s) 1008 memory management unit (MMU) experiences a miss, an address translation request may be transmitted to the CPU(s) 1006. In response, the CPU(s) 1006 may look in its page tables for the virtual-to-physical mapping for the address and transmits the translation back to the GPU(s) 1008. As such, unified memory technology may allow a single unified virtual address space for memory of both the CPU(s) 1006 and the GPU(s) 1008, thereby simplifying the GPU(s) 1008 programming and porting of applications to the GPU(s) 1008.

In addition, the GPU(s) 1008 may include an access counter that may keep track of the frequency of access of the GPU(s) 1008 to memory of other processors. The access counter may help ensure that memory pages are moved to the physical memory of the processor that is accessing the pages most frequently.

The SoC(s) 1004 may include any number of cache(s) 1012, including those described herein. For example, the cache(s) 1012 may include an L3 cache that is available to both the CPU(s) 1006 and the GPU(s) 1008 (e.g., that is connected both the CPU(s) 1006 and the GPU(s) 1008). The cache(s) 1012 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1004 may include one or more accelerators 1014 (e.g., hardware accelerators, software accelerators, or a combination thereof). For example, the SoC(s) 1004 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1008 and to off-load some of the tasks of the GPU(s) 1008 (e.g., to free up more cycles of the GPU(s) 1008 for performing other tasks). As an example, the accelerator(s) 1014 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1014 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1008, and by using an inference accelerator, for example, a designer may target either the DLA(s) or the GPU(s) 1008 for any function. For example, the designer may focus processing of CNNs and floating point operations on the DLA(s) and leave other functions to the GPU(s) 1008 and/or other accelerator(s) 1014.

The accelerator(s) 1014 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1006. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SEID), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1014 (e.g., the hardware acceleration cluster) may include a computer vision network on-chip and SRAM, for providing a high-bandwidth, low latency SRAM for the accelerator(s) 1014. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1004 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

The accelerator(s) 1014 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1066 output that correlates with the vehicle 1000 orientation, distance, 3D location estimates of the object obtained from the neural network and/or other sensors (e.g., LIDAR sensor(s) 1064 or RADAR sensor(s) 1060), among others.

The SoC(s) 1004 may include data store(s) 1016 (e.g., memory). The data store(s) 1016 may be on-chip memory of the SoC(s) 1004, which may store neural networks to be executed on the GPU and/or the DLA. In some examples, the data store(s) 1016 may be large enough in capacity to store multiple instances of neural networks for redundancy and safety. The data store(s) 1012 may comprise L2 or L3 cache(s) 1012. Reference to the data store(s) 1016 may include reference to the memory associated with the PVA, DLA, and/or other accelerator(s) 1014, as described herein.

The SoC(s) 1004 may include one or more processor(s) 1010 (e.g., embedded processors). The processor(s) 1010 may include a boot and power management processor that may be a dedicated processor and subsystem to handle boot power and management functions and related security enforcement. The boot and power management processor may be a part of the SoC(s) 1004 boot sequence and may provide runtime power management services. The boot power and management processor may provide clock and voltage programming, assistance in system low power state transitions, management of SoC(s) 1004 thermals and temperature sensors, and/or management of the SoC(s) 1004 power states. Each temperature sensor may be implemented as a ring-oscillator whose output frequency is proportional to temperature, and the SoC(s) 1004 may use the ring-oscillators to detect temperatures of the CPU(s) 1006, GPU(s) 1008, and/or accelerator(s) 1014. If temperatures are determined to exceed a threshold, the boot and power management processor may enter a temperature fault routine and put the SoC(s) 1004 into a lower power state and/or put the vehicle 1000 into a chauffeur to safe stop mode (e.g., bring the vehicle 1000 to a safe stop).

The processor(s) 1010 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1010 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1010 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1010 may further include a real-time camera engine that may include a dedicated processor subsystem for handling real-time camera management.

The processor(s) 1010 may further include a high-dynamic range signal processor that may include an image signal processor that is a hardware engine that is part of the camera processing pipeline.

The processor(s) 1010 may include a video image compositor that may be a processing block (e.g., implemented on a microprocessor) that implements video post-processing functions needed by a video playback application to produce the final image for the player window. The video image compositor may perform lens distortion correction on wide-view camera(s) 1070, surround camera(s) 1074, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1008 is not required to continuously render new surfaces. Even when the GPU(s) 1008 is powered on and active doing 3D rendering, the video image compositor may be used to offload the GPU(s) 1008 to improve performance and responsiveness.

The SoC(s) 1004 may further include a mobile industry processor interface (MIPI) camera serial interface for receiving video and input from cameras, a high-speed interface, and/or a video input block that may be used for camera and related pixel input functions. The SoC(s) 1004 may further include an input/output controller(s) that may be controlled by software and may be used for receiving I/O signals that are uncommitted to a specific role.

The SoC(s) 1004 may further include a broad range of peripheral interfaces to enable communication with peripherals, audio codecs, power management, and/or other devices. The SoC(s) 1004 may be used to process data from cameras (e.g., connected over Gigabit Multimedia Serial Link and Ethernet), sensors (e.g., LIDAR sensor(s) 1064, RADAR sensor(s) 1060, etc. that may be connected over Ethernet), data from bus 1002 (e.g., speed of vehicle 1000, steering wheel position, etc.), data from GNSS sensor(s) 1058 (e.g., connected over Ethernet or CAN bus). The SoC(s) 1004 may further include dedicated high-performance mass storage controllers that may include their own DMA engines, and that may be used to free the CPU(s) 1006 from routine data management tasks.

The SoC(s) 1004 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1004 may be faster, more reliable, and even more energy-efficient and space-efficient than conventional systems. For example, the accelerator(s) 1014, when combined with the CPU(s) 1006, the GPU(s) 1008, and the data store(s) 1016, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1020) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1008.

In some examples, a CNN for facial recognition and vehicle owner identification may use data from camera sensors to identify the presence of an authorized driver and/or owner of the vehicle 1000. The always on sensor processing engine may be used to unlock the vehicle when the owner approaches the driver door and turn on the lights, and, in security mode, to disable the vehicle when the owner leaves the vehicle. In this way, the SoC(s) 1004 provide for security against theft and/or carjacking.

In another example, a CNN for emergency vehicle detection and identification may use data from microphones 1096 to detect and identify emergency vehicle sirens. In contrast to conventional systems, that use general classifiers to detect sirens and manually extract features, the SoC(s) 1004 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1058. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1062, until the emergency vehicle(s) passes.

The vehicle may include a CPU(s) 1018 (e.g., discrete CPU(s), or dCPU(s)), that may be coupled to the SoC(s) 1004 via a high-speed interconnect (e.g., PCIe). The CPU(s) 1018 may include an X86 processor, for example. The CPU(s) 1018 may be used to perform any of a variety of functions, including arbitrating potentially inconsistent results between ADAS sensors and the SoC(s) 1004, and/or monitoring the status and health of the controller(s) 1036 and/or infotainment SoC 1030, for example.

The vehicle 1000 may include a GPU(s) 1020 (e.g., discrete GPU(s), or dGPU(s)), that may be coupled to the SoC(s) 1004 via a high-speed interconnect (e.g., NVIDIA's NVLINK). The GPU(s) 1020 may provide additional artificial intelligence functionality, such as by executing redundant and/or different neural networks, and may be used to train and/or update neural networks based on input (e.g., sensor data) from sensors of the vehicle 1000.

The vehicle 1000 may further include the network interface 1024 which may include one or more wireless antennas 1026 (e.g., one or more wireless antennas for different communication protocols, such as a cellular antenna, a Bluetooth antenna, etc.). The network interface 1024 may be used to enable wireless connectivity over the Internet with the cloud (e.g., with the server(s) 1078 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1000 information about vehicles in proximity to the vehicle 1000 (e.g., vehicles in front of, on the side of, and/or behind the vehicle 1000). This functionality may be part of a cooperative adaptive cruise control functionality of the vehicle 1000.

The network interface 1024 may include a SoC that provides modulation and demodulation functionality and enables the controller(s) 1036 to communicate over wireless networks. The network interface 1024 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1000 may further include data store(s) 1028 which may include off-chip (e.g., off the SoC(s) 1004) storage. The data store(s) 1028 may include one or more storage elements including RAM, SRAM, DRAM, VRAM, Flash, hard disks, and/or other components and/or devices that may store at least one bit of data.

The vehicle 1000 may further include GNSS sensor(s) 1058. The GNSS sensor(s) 1058 (e.g., GPS and/or assisted GPS sensors), to assist in mapping, perception, occupancy grid generation, and/or path planning functions. Any number of GNSS sensor(s) 1058 may be used, including, for example and without limitation, a GPS using a USB connector with an Ethernet to Serial (RS-232) bridge.

The vehicle 1000 may further include RADAR sensor(s) 1060. The RADAR sensor(s) 1060 may be used by the vehicle 1000 for long-range vehicle detection, even in darkness and/or severe weather conditions. RADAR functional safety levels may be ASIL B. The RADAR sensor(s) 1060 may use the CAN and/or the bus 1002 (e.g., to transmit data generated by the RADAR sensor(s) 1060) for control and to access object tracking data, with access to Ethernet to access raw data in some examples. A wide variety of RADAR sensor types may be used. For example, and without limitation, the RADAR sensor(s) 1060 may be suitable for front, rear, and side RADAR use. In some example, Pulse Doppler RADAR sensor(s) are used.

The RADAR sensor(s) 1060 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1060 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1000 surroundings at higher speeds with minimal interference from traffic in adjacent lanes. The other two antennae may expand the field of view, making it possible to quickly detect vehicles entering or leaving the vehicle's 1000 lane.

Mid-range RADAR systems may include, as an example, a range of up to 1060 m (front) or 80 m (rear), and a field of view of up to 42 degrees (front) or 1050 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1000 may further include ultrasonic sensor(s) 1062. The ultrasonic sensor(s) 1062, which may be positioned at the front, back, and/or the sides of the vehicle 1000, may be used for park assist and/or to create and update an occupancy grid. A wide variety of ultrasonic sensor(s) 1062 may be used, and different ultrasonic sensor(s) 1062 may be used for different ranges of detection (e.g., 2.5 m, 4 m). The ultrasonic sensor(s) 1062 may operate at functional safety levels of ASIL B.

The vehicle 1000 may include LIDAR sensor(s) 1064. The LIDAR sensor(s) 1064 may be used for object and pedestrian detection, emergency braking, collision avoidance, and/or other functions. The LIDAR sensor(s) 1064 may be functional safety level ASIL B. In some examples, the vehicle 1000 may include multiple LIDAR sensors 1064 (e.g., two, four, six, etc.) that may use Ethernet (e.g., to provide data to a Gigabit Ethernet switch).

In some examples, the LIDAR sensor(s) 1064 may be capable of providing a list of objects and their distances for a 360-degree field of view. Commercially available LIDAR sensor(s) 1064 may have an advertised range of approximately 1000 m, with an accuracy of 2 cm-3 cm, and with support for a 1000 Mbps Ethernet connection, for example. In some examples, one or more non-protruding LIDAR sensors 1064 may be used. In such examples, the LIDAR sensor(s) 1064 may be implemented as a small device that may be embedded into the front, rear, sides, and/or corners of the vehicle 1000. The LIDAR sensor(s) 1064, in such examples, may provide up to a 1020-degree horizontal and 35-degree vertical field-of-view, with a 200 m range even for low-reflectivity objects. Front-mounted LIDAR sensor(s) 1064 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1000. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1064 may be less susceptible to motion blur, vibration, and/or shock.

The vehicle may further include IMU sensor(s) 1066. The IMU sensor(s) 1066 may be located at a center of the rear axle of the vehicle 1000, in some examples. The IMU sensor(s) 1066 may include, for example and without limitation, an accelerometer(s), a magnetometer(s), a gyroscope (s), a magnetic compass(es), and/or other sensor types. In some examples, such as in six-axis applications, the IMU sensor(s) 1066 may include accelerometers and gyroscopes, while in nine-axis applications, the IMU sensor(s) 1066 may include accelerometers, gyroscopes, and magnetometers.

In some embodiments, the IMU sensor(s) 1066 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1066 may enable the vehicle 1000 to estimate heading without requiring input from a magnetic sensor by directly observing and correlating the changes in velocity from GPS to the IMU sensor(s) 1066. In some examples, the IMU sensor(s) 1066 and the GNSS sensor(s) 1058 may be combined in a single integrated unit.

The vehicle may include microphone(s) 1096 placed in and/or around the vehicle 1000. The microphone(s) 1096 may be used for emergency vehicle detection and identification, among other things.

The vehicle may further include any number of camera types, including stereo camera(s) 1068, wide-view camera(s) 1070, infrared camera(s) 1072, surround camera(s) 1074, long-range and/or mid-range camera(s) 1098, and/or other camera types. The cameras may be used to capture image data around an entire periphery of the vehicle 1000. The types of cameras used depends on the embodiments and requirements for the vehicle 1000, and any combination of camera types may be used to provide the necessary coverage around the vehicle 1000. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 10A and FIG. 10B.

The vehicle 1000 may further include vibration sensor(s) 1042. The vibration sensor(s) 1042 may measure vibrations of components of the vehicle, such as the axle(s). For example, changes in vibrations may indicate a change in road surfaces. In another example, when two or more vibration sensors 1042 are used, the differences between the vibrations may be used to determine friction or slippage of the road surface (e.g., when the difference in vibration is between a power-driven axle and a freely rotating axle).

The vehicle 1000 may include an ADAS system 1038. The ADAS system 1038 may include a SoC, in some examples. The ADAS system 1038 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1060, LIDAR sensor(s) 1064, and/or a camera(s). The ACC systems may include longitudinal ACC and/or lateral ACC. Longitudinal ACC monitors and controls the distance to the vehicle immediately ahead of the vehicle 1000 and automatically adjust the vehicle speed to maintain a safe distance from vehicles ahead. Lateral ACC performs distance keeping, and advises the vehicle 1000 to change lanes when necessary. Lateral ACC is related to other ADAS applications such as LCA and CWS.

CACC uses information from other vehicles that may be received via the network interface 1024 and/or the wireless antenna(s) 1026 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1000), while the I2V communication concept provides information about traffic further ahead. CACC systems may include either or both I2V and V2V information sources. Given the information of the vehicles ahead of the vehicle

1000, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1060, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1060, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1000 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1000 if the vehicle 1000 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1060, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1000 is backing up. Some RCTW systems include AEB to ensure that the vehicle brakes are applied to avoid a crash. RCTW systems may use one or more rear-facing RADAR sensor(s) 1060, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1000, the vehicle 1000 itself must, in the case of conflicting results, decide whether to heed the result from a primary computer or a secondary computer (e.g., a first controller 1036 or a second controller 1036). For example, in some embodiments, the ADAS system 1038 may be a backup and/or secondary computer for providing perception information to a backup computer rationality module. The backup computer rationality monitor may run a redundant diverse software on hardware components to detect faults in perception and dynamic driving tasks. Outputs from the ADAS system 1038 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1004.

In other examples, ADAS system 1038 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1038 may be fed into the primary computer's perception block and/or the primary computer's dynamic driving task block. For example, if the ADAS system 1038 indicates a forward crash warning due to an object immediately ahead, the perception block may use this information when identifying objects. In other examples, the secondary computer may have its own neural network which is trained and thus reduces the risk of false positives, as described herein.

The vehicle 1000 may further include the infotainment SoC 1030 (e.g., an in-vehicle infotainment system (IVI)). Although illustrated and described as a SoC, the infotainment system may not be a SoC, and may include two or more discrete components. The infotainment SoC 1030 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1000. For example, the infotainment SoC 1030 may radios, disk players, navigation systems, video players, USB and Bluetooth connectivity, carputers, in-car entertainment, Wi-Fi, steering wheel audio controls, hands free voice control, a heads-up display (HUD), an HMI display 1034, a telematics device, a control panel (e.g., for controlling and/or interacting with various components, features, and/or systems), and/or other components. The infotainment SoC 1030 may further be used to provide information (e.g., visual and/or audible) to a user(s) of the vehicle, such as information from the ADAS system 1038, autonomous driving information such as planned vehicle maneuvers, trajectories, surrounding environment information (e.g., intersection information, vehicle information, road information, etc.), and/or other information.

The infotainment SoC 1030 may include GPU functionality. The infotainment SoC 1030 may communicate over the bus 1002 (e.g., CAN bus, Ethernet, etc.) with other devices, systems, and/or components of the vehicle 1000. In some examples, the infotainment SoC 1030 may be coupled to a supervisory MCU such that the GPU of the infotainment system may perform some self-driving functions in the event that the primary controller(s) 1036 (e.g., the primary and/or backup computers of the vehicle 1000) fail. In such an example, the infotainment SoC 1030 may put the vehicle 1000 into a chauffeur to safe stop mode, as described herein.

The vehicle 1000 may further include an instrument cluster 1032 (e.g., a digital dash, an electronic instrument cluster, a digital instrument panel, etc.). The instrument cluster 1032 may include a controller and/or supercomputer (e.g., a discrete controller or supercomputer). The instrument cluster 1032 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1030 and the instrument cluster 1032. In other words, the instrument cluster 1032 may be included as part of the infotainment SoC 1030, or vice versa.

Figure 10D:
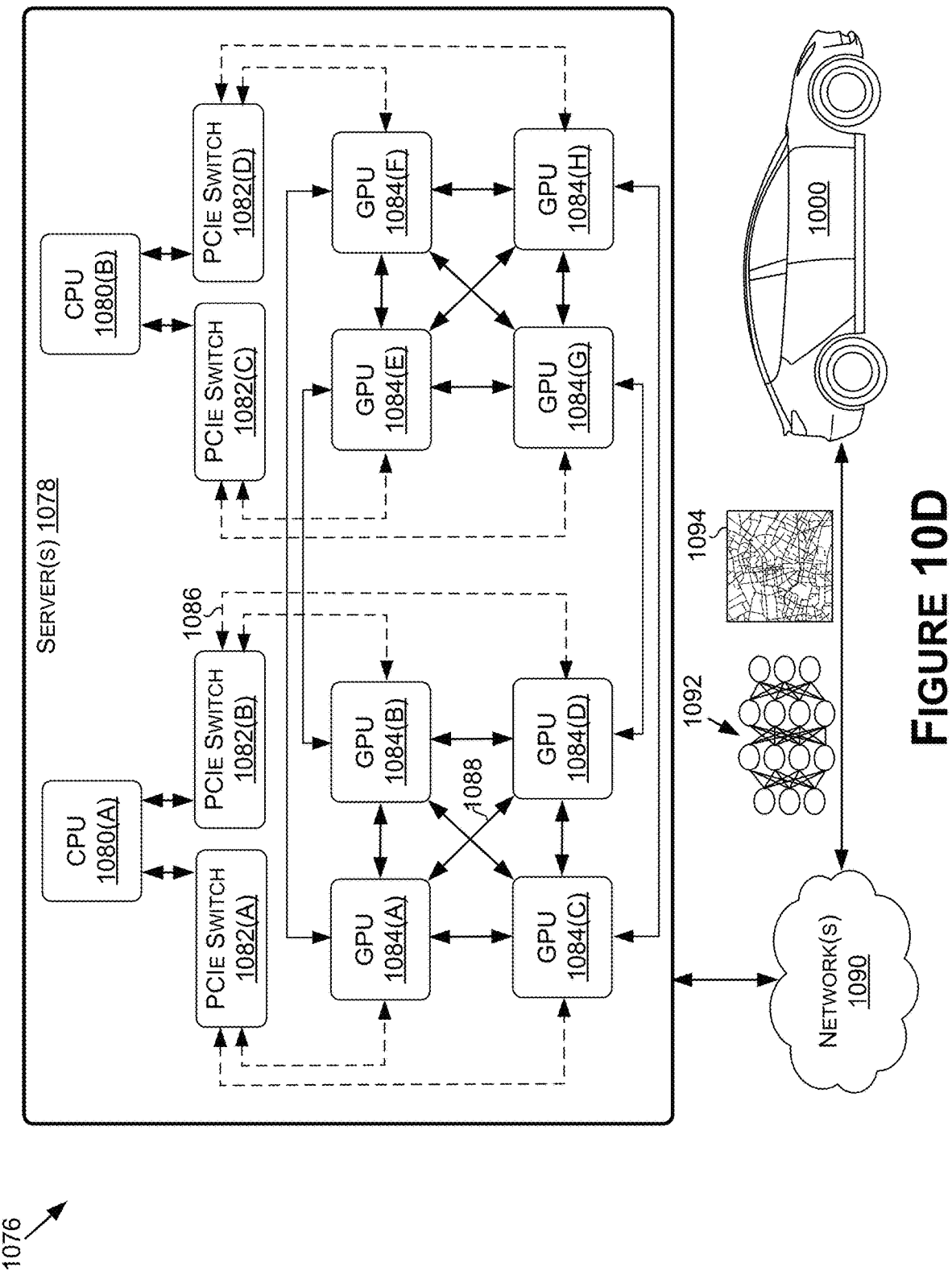
FIG. 10D is a system diagram for communication between cloud-based server(s) and the example autonomous vehicle of FIG. 10A, in accordance with some embodiments of the present disclosure.

FIG. 10D is a system diagram for communication between cloud-based server(s) and the example autonomous vehicle 1000 of FIG. 10A, in accordance with some embodiments of the present disclosure. The system 1076 may include server(s) 1078, network(s) 1090, and vehicles, including the vehicle 1000. The server(s) 1078 may include a plurality of GPUs 1084(A)-1084(H) (collectively referred to herein as GPUs 1084), PCIe switches 1082(A)-1082(H) (collectively referred to herein as PCIe switches 1082), and/or CPUs 1080(A)-1080(B) (collectively referred to herein as CPUs 1080). The GPUs 1084, the CPUs 1080, and the PCIe switches may be interconnected with high-speed interconnects such as, for example and without limitation, NVLink interfaces 1088 developed by NVIDIA and/or PCIe connections 1086. In some examples, the GPUs 1084 are connected via NVLink and/or NVSwitch SoC and the GPUs 1084 and the PCIe switches 1082 are connected via PCIe interconnects. Although eight GPUs 1084, two CPUs 1080, and two PCIe switches are illustrated, this is not intended to be limiting. Depending on the embodiment, each of the server(s) 1078 may include any number of GPUs 1084, CPUs 1080, and/or PCIe switches. For example, the server (s) 1078 may each include eight, sixteen, thirty-two, and/or more GPUs 1084.

The server(s) 1078 may receive, over the network(s) 1090 and from the vehicles, image data representative of images showing unexpected or changed road conditions, such as recently commenced road-work. The server(s) 1078 may transmit, over the network(s) 1090 and to the vehicles, neural networks 1092, updated neural networks 1092, and/or map information 1094, including information regarding traffic and road conditions. The updates to the map information 1094 may include updates for the HD map 1022, such as information regarding construction sites, potholes, detours, flooding, and/or other obstructions. In some examples, the neural networks 1092, the updated neural networks 1092, and/or the map information 1094 may have resulted from new training and/or experiences represented in data received from any number of vehicles in the environment, and/or based on training performed at a datacenter (e.g., using the server(s) 1078 and/or other servers).

The server(s) 1078 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Once the machine learning models are trained, the machine learning models may be used by the vehicles (e.g., transmitted to the vehicles over the network(s) 1090, and/or the machine learning models may be used by the server(s) 1078 to remotely monitor the vehicles.

In some examples, the server(s) 1078 may receive data from the vehicles and apply the data to up-to-date real-time neural networks for real-time intelligent inferencing. The server(s) 1078 may include deep-learning supercomputers and/or dedicated AI computers powered by GPU(s) 1084, such as a DGX and DGX Station machines developed by NVIDIA. However, in some examples, the server(s) 1078 may include deep learning infrastructure that use only CPU-powered datacenters.

The deep-learning infrastructure of the server(s) 1078 may be capable of fast, real-time inferencing, and may use that capability to evaluate and verify the health of the processors, software, and/or associated hardware in the vehicle 1000. For example, the deep-learning infrastructure may receive periodic updates from the vehicle 1000, such as a sequence of images and/or objects that the vehicle 1000 has located in that sequence of images (e.g., via computer vision and/or other machine learning object classification techniques). The deep-learning infrastructure may run its own neural network to identify the objects and compare them with the objects identified by the vehicle 1000 and, if the results do not match and the infrastructure concludes that the AI in the vehicle 1000 is malfunctioning, the server(s) 1078 may transmit a signal to the vehicle 1000 instructing a fail-safe computer of the vehicle 1000 to assume control, notify the passengers, and complete a safe parking maneuver.

For inferencing, the server(s) 1078 may include the GPU(s) 1084 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 11:
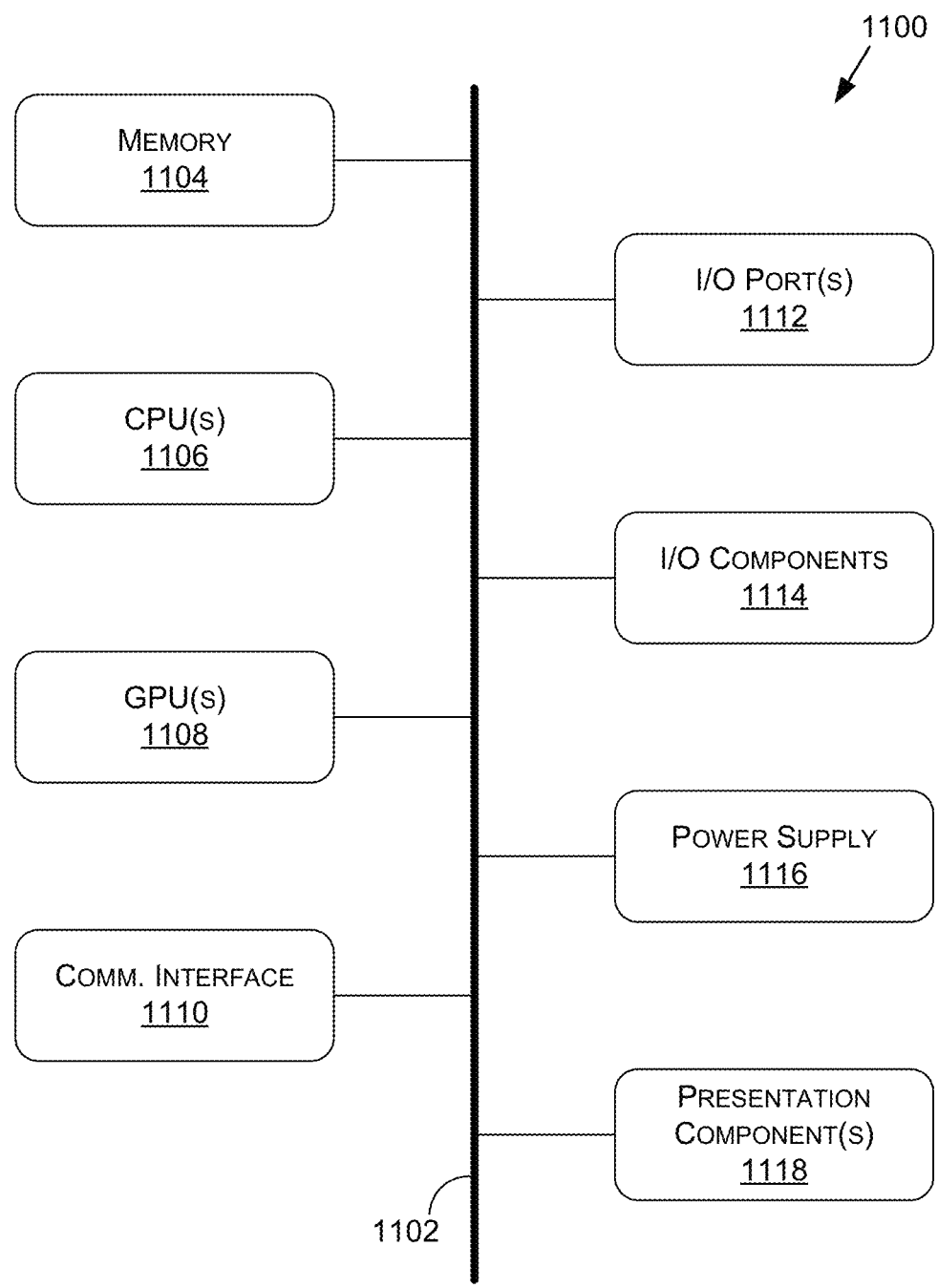
FIG. 11 is a block diagram of an example computing device suitable for use in implementing some embodiments of the present disclosure.

FIG. 11 is a block diagram of an example computing device 1100 suitable for use in implementing some embodiments of the present disclosure. For example, the machine learning model(s) 108 may be executed within any of a plurality of systems, and the systems may include some or all of the components of the computing device 1100. As such, the underlying software and/or hardware that may be fault tested using the processes 100 and 700 may include one or more components—or components similar thereto—of the computing device 1100. The computing device 1100 may include a bus 1102 that directly or indirectly couples the following devices: memory 1104, one or more central processing units (CPUs) 1106, one or more graphics processing units (GPUs) 1108, a communication interface 1110, input/output (I/O) ports 1112, input/output components 1114, a power supply 1116, and one or more presentation components 1118 (e.g., display(s)).

Although the various blocks of FIG. 11 are shown as connected via the bus 1102 with lines, this is not intended to be limiting and is for clarity only. For example, in some embodiments, a presentation component 1118, such as a display device, may be considered an I/O component 1114 (e.g., if the display is a touch screen). As another example, the CPUs 1106 and/or GPUs 1108 may include memory (e.g., the memory 1104 may be representative of a storage device in addition to the memory of the GPUs 1108, the CPUs 1106, and/or other components). In other words, the computing device of FIG. 11 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 11.

The bus 1102 may represent one or more busses, such as an address bus, a data bus, a control bus, or a combination thereof. The bus 1102 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 1104 may include any of a variety of computer-readable media. The computer-readable media may be any available media that may be accessed by the computing device 1100. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1104 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1100. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 1106 may be configured to execute the computer-readable instructions to control one or more components of the computing device 1100 to perform one or more of the methods and/or processes described herein. The CPU(s) 1106 may each include one or more cores (e.g., one, two, four, eight, twenty-eight, seventy-two, etc.) that are capable of handling a multitude of software threads simultaneously. The CPU(s) 1106 may include any type of processor, and may include different types of processors depending on the type of computing device 1100 implemented (e.g., processors with fewer cores for mobile devices and processors with more cores for servers). For example, depending on the type of computing device 1100, the processor may be an ARM processor implemented using Reduced Instruction Set Computing (RISC) or an x86 processor implemented using Complex Instruction Set Computing (CISC). The computing device 1100 may include one or more CPUs 1106 in addition to one or more microprocessors or supplementary co-processors, such as math co-processors.

The GPU(s) 1108 may be used by the computing device 1100 to render graphics (e.g., 3D graphics). The GPU(s) 1108 may include hundreds or thousands of cores that are capable of handling hundreds or thousands of software threads simultaneously. The GPU(s) 1108 may generate pixel data for output images in response to rendering commands (e.g., rendering commands from the CPU(s) 1106 received via a host interface). The GPU(s) 1108 may include graphics memory, such as display memory, for storing pixel data. The display memory may be included as part of the memory 1104. The GPU(s) 708 may include two or more GPUs operating in parallel (e.g., via a link). When combined together, each GPU 1108 may generate pixel data for different portions of an output image or for different output images (e.g., a first GPU for a first image and a second GPU for a second image). Each GPU may include its own memory, or may share memory with other GPUs.

In examples where the computing device 1100 does not include the GPU(s) 1108, the CPU(s) 1106 may be used to render graphics.

The communication interface 1110 may include one or more receivers, transmitters, and/or transceivers that enable the computing device 700 to communicate with other computing devices via an electronic communication network, included wired and/or wireless communications. The communication interface 1110 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 1112 may enable the computing device 1100 to be logically coupled to other devices including the I/O components 1114, the presentation component(s) 1118, and/or other components, some of which may be built in to (e.g., integrated in) the computing device 1100. Illustrative I/O components 1114 include a microphone, mouse, keyboard, joystick, game pad, game controller, satellite dish, scanner, printer, wireless device, etc. The I/O components 1114 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1100. The computing device 1100 may be include depth cameras, such as stereoscopic camera systems, infrared camera systems, RGB camera systems, touchscreen technology, and combinations of these, for gesture detection and recognition. Additionally, the computing device 1100 may include accelerometers or gyroscopes (e.g., as part of an inertia measurement unit (IMU)) that enable detection of motion. In some examples, the output of the accelerometers or gyroscopes may be used by the computing device 1100 to render immersive augmented reality or virtual reality.

The power supply 1116 may include a hard-wired power supply, a battery power supply, or a combination thereof. The power supply 1116 may provide power to the computing device 1100 to enable the components of the computing device 1100 to operate.

The presentation component(s) 1118 may include a display (e.g., a monitor, a touch screen, a television screen, a heads-up-display (HUD), other display types, or a combination thereof), speakers, and/or other presentation components. The presentation component(s) 1118 may receive data from other components (e.g., the GPU(s) 1108, the CPU(s) 1106, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
applying, to one or more machine learning models (MLMs), input data including (i) first data representing a frame of sensor data generated using one or more sensors of a machine and (ii) second data representing one or more patterns incorporated into a portion of the input data that is separate from the frame of the sensor data based at least on the one or more MLMs being trained to perform one or more tasks corresponding to the one or more patterns;
determining, based at least on the applying, one or more predictions corresponding to the input data;
performing an evaluation of the one or more predictions with respect to the one or more patterns; and
performing one or more operations associated with the machine based at least on the evaluation.

2. The method of claim 1, wherein the one or more predictions include one or more first prediction corresponding to the first data and one or more second predictions corresponding to the second data.

3. The method of claim 1, wherein the comprises a first region of an input image to the one or more MLMs and the portion of the input data comprises a second region of the input image to the one or more MLMs.

4. The method of claim 1, wherein the frame corresponds to a first region of an input image to the one or more MLMs, the first region having a spatial resolution that is smaller than an input resolution to the one or more MLMs, and the portion of the input data is included, at least in part, in a second region of the input image that is outside of a boundary of the first region.

5. The method of claim 1, wherein the one or more patterns include a plurality of patterns representing different respective types of objects that the one or more MLMs are trained to detect in the input data.

6. The method of claim 1, wherein the performing the one or more operations associated with the machine includes performing fault detection based at least on the evaluation.

7. The method of claim 1, wherein, the one or more MLMs are further trained to perform one or more second tasks corresponding to one or more second patterns that are different than the one or more patterns, and the one or more operations are performed based at least on the one or more MLMs detecting the one or more second patterns in the first data.

8. The method of claim 1, wherein the one or more sensors include a vision-based sensor of a vehicle, and the one or more operations are associated with semi-autonomous driving or autonomous driving functionalities of the vehicle.

9. The method of claim 1, wherein, when one or more expected predictions corresponding to the one or more patterns are not indicated by the one or more predictions, the one or more operations include suspending or terminating at least one operation associated with the machine.

10. A system comprising:
one or more processing units to perform operations including:
determining, using a first plurality of iterations of applying one or more inputs to one or more machine learning models (MLMs), a first plurality of predictions corresponding to first sensor data of one or more first instances in a sequence of instances of sensor data captured using at least one sensor;
interspersed with the first plurality of iterations, determining, using a second plurality of iterations of applying input data to the one or more machine learning models, a second plurality of predictions corresponding to the input data, the input data including (i) first data representing a frame of second sensor data of one or more second instances in the sequence of instances of sensor data, and (ii) second data representing one or more patterns incorporated into a portion of the input data that is separate from the frame for the one or more second instances in the sequence of instances of sensor data based at least on the one or more MLMs being trained to perform one or more tasks corresponding to the one or more patterns;
comparing the one or more predictions of the second plurality of predictions to one or more expected predictions corresponding to the one or more patterns; and
performing fault detection based at least on the comparing the one or more predictions to the one or more expected predictions.

11. The system of claim 10, wherein the performing the fault detection includes determining that hardware corresponding to processing of the one or more machine learning models has a fault when the one or more predictions do not correspond to the one or more expected predictions.

12. The system of claim 10, wherein the first plurality of predictions are used to perform one or more operations when the one or more predictions correspond to the one or more expected predictions.

13. The system of claim 10, wherein types of objects represented by the one or more patterns are changed at different iterations of the second plurality of iterations.

14. The system of claim 10, wherein the fault detection corresponds to a built-in self-test (BIST) system of a machine during operation.

15. The system of claim 10, wherein the second plurality of predictions include one or more predicted locations of the one or more patterns in one or more input images to the one or more MLMs.

16. The system of claim 10, wherein the system is comprised in at least one of:
a control system for an autonomous or semi-autonomous machine;
a perception system for an autonomous or semi-autonomous machine;
a system for performing simulation operations;
a system for performing ray-tracing operations;
a system for performing deep learning operations;
a system implemented using a robot;
a system for presenting at least one of virtual reality content or augmented reality content;
a system implemented at least partially in a data center; or
a system implemented at least partially using cloud computing resources.

17. A processor comprising:
one or more circuits to perform an evaluation of one or more neural networks, the evaluation including comparing one or more predictions of the one or more neural networks to one or more expected predictions of the one or more neural networks, the one or more predictions and the one or more expected predictions corresponding to input data applied to the one or more neural networks to generate the one or more predictions, the input data including (i) first data representing a frame of sensor data, and (ii) second data representing one or more augmented features incorporated into a portion of the input data that is separate from the frame for one or more instances of the sensor data based at least on the one or more neural networks being trained to perform one or more tasks corresponding to the one or more augmented features.

18. The processor of claim 17, wherein the one or more predictions indicate one or more locations associated with the one or more augmented features, and the evaluation is performed based at least on comparing the one or more locations to one or more known locations associated with the one or more augmented features.

19. The processor of claim 17, wherein at least one of:
the one or more augmented features correspond to at least one of one or more objects or one or more environmental features and the one or more neural networks are trained to detect the at least one of the one or more objects or the one or more environmental features; or
the one or more augmented features are associated with one or more class labels and the one or more neural networks are trained to compute outputs indicating the one or more class labels.

20. The processor of claim 17, wherein the processor is comprised in at least one of:
a control system for an autonomous or semi-autonomous machine;
a perception system for an autonomous or semi-autonomous machine;
a system for performing simulation operations;
a system for performing ray-tracing operations;
a system for performing deep learning operations;
a system implemented using a robot;

a system for presenting at least one of virtual reality content or augmented reality content;
a system implemented at least partially in a data center; or
a system implemented at least partially using cloud computing resources.

* * * * *